United States Patent [19]
Taira et al.

[11] Patent Number: 6,014,193
[45] Date of Patent: Jan. 11, 2000

[54] LIQUID CRYSTAL DISPLAY DEVICE

[75] Inventors: Kazuki Taira, Kawasaki; Yujiro Hara, Yokohama; Goh Itoh, Yokohama; Yukio Kizaki, Yokohama; Rei Hasegawa, Yokohama; Miki Mori, Yokohama, all of Japan

[73] Assignee: Kabushiki Kaisha Toshiba, Kawasaki, Japan

[21] Appl. No.: 09/126,089

[22] Filed: Jul. 30, 1998

[30] Foreign Application Priority Data

Jul. 31, 1997 [JP] Japan .................................. P9-206767

[51] Int. Cl.⁷ .......................... G03F 1/133; G02F 1/1333; G09G 3/36
[52] U.S. Cl. .................................. 349/73; 345/90; 349/110
[58] Field of Search ......................... 349/73, 110; 345/903, 345/90, 87, 84

[56] References Cited

U.S. PATENT DOCUMENTS

| | | | |
|---|---|---|---|
| 4,300,137 | 11/1981 | Fujita et al. | 340/765 |
| 4,952,032 | 8/1990 | Inoue et al. | 350/350 |
| 5,164,853 | 11/1992 | Shimazaki | 359/82 |
| 5,189,500 | 2/1993 | Kusunoki | 359/72 |
| 5,767,924 | 6/1998 | Hiroki et al. | 349/73 |
| 5,808,719 | 9/1998 | Fujiwara et al. | 349/110 |

FOREIGN PATENT DOCUMENTS 1292320 11/1989 Japan .
8-76074 3/1996 Japan .

*Primary Examiner*—William L. Sikes
*Assistant Examiner*—Joanne Kim
*Attorney, Agent, or Firm*—Oblon, Spivak, McClelland, Maier & Neustadt, P.C.

[57] ABSTRACT

A liquid crystal display device includes a matrix array of picture elements formed on a plurality of tiled switching array substrates, a first substrate having pixel electrodes arranged in parallel on the picture elements, a second substrate having a counter electrode, and a liquid crystal layer interposed between the first substrate and the second substrate. The picture elements include first picture elements arranged on every column from both sides of a connecting boundary A-A' of the switching array substrates and second picture elements arranged alternately with the first picture elements, and have a black matrix for shielding a region between the adjacent picture elements. A plurality of data lines may be disposed collectively between the first picture elements. With the configuration as described above, a liquid crystal display device having high productivity, a large display screen and high display quality can be provided.

18 Claims, 20 Drawing Sheets

LIQUID CRYSTAL DISPLAY DEVICE

BACKGROUND OF THE INVENTION

1. Field of the Invention

The invention relates to a liquid crystal display device, and more particularly to a liquid crystal display device that is capable of displaying images on a large screen by tiling a plurality of liquid crystal display panels or switching array substrates.

The invention also relates to a liquid crystal display device having a large display screen capable of displaying images with high quality.

2. Description of the Related Art

Demands for a large-screen display device are increasing these years. For example, demands for a large-screen television set for home use are high. Those display allows to promote a quality and gives a realism of an experience of watching a TV. However, when a conventional CRT is made to have a larger screen, its volume and weight increase. Thus, it is highly focused to supply a large-screen flat panel display, which can be made thin and lightweight.

A liquid crystal display device is one of promising device among the flat panel display devices. However, it is difficult to achieve a large 40-inch class display by a single liquid crystal panel in view of production facilities and productivity.

Under such circumstances, there have been made several proposals including a method of combining a single large screen by connecting a plurality of liquid crystal panels.

For example, Japanese Patent Laid-Open Application No. Hei 8-76074 proposes a method of directly connecting liquid crystal panels in parallel to each other. This method has an advantage that a large screen can be made with taking full advantage of a thin feature of the liquid crystal display devices as it is.

Where liquid crystal panels are directly connected in parallel to each other, display quality of a formed display screen depends highly on a width of the connecting region between the liquid crystal panels. When the connecting region has a large width and the display region of the connected panels is divided, the connecting region is recognized as a disturbing line to the observer. This is because the connecting region is a non-display region.

To fulfill such conditions, Japanese Patent Laid-Open Application No. Hei 8-76074 proposes a method of forming a width, which is equal to or larger than a width required for connecting liquid crystal panels, as a black matrix (BM) region between picture elements of the individual liquid crystal panel.

In the LCD, to prevent the connecting region from being recognized visually, a width of BM on the display region other than the connecting region is required to be equal to a width of BM on the connecting region. When a width of BM in a direction parallel to a data line of a single liquid crystal display panel is taken into account, BM of the connecting region has a width equal to a summary of a margin for connection and a seal width. Therefore, a connecting region of about 300 $\mu$m or more is required under the present conditions.

Meanwhile, every BM except the connecting region is required to have a width to cover the data line and a area between the data line and the pixel electrode. Therefore, its width is preferably about 30 $\mu$m.

In other words, a liquid crystal display device having a large screen formed by directly connecting liquid crystal display panels in parallel requires making the width of every black matrix except the connecting region with a width wider than a preferable width.

A conventional liquid crystal display device having liquid crystal display panels directly connected in parallel to each other will be described with reference to FIG. 19.

FIG. 19 is an enlarged schematic diagram of a pixel part in a region other than a connecting region of a display region. Reference numerals 91R, 91G, 91B denote pixels R, G, B, and these three pixel electrodes form one picture element. To the respective pixel electrodes are connected TFTs 92a, 92b, 92c which are non-linear switching elements, and the three TFTs 92a, 92b, 92c belonging to one picture element are connected to the same gate line 94. These three TFTs 92a, 92b, 92c are also connected to different data lines 93r, 93g, 93b.

The respective pixel electrodes, the TFTs connected thereto and the data lines have the same positional relationship of three R, G and B. However, between the neighboring picture elements, a non-illustrated black matrix (BM) with width $L_{BM}$ is formed to cover the non-display region of the connecting region. Since there is a data line between the neighboring pixels in a single picture element, width LS of the black matrix between the adjacent pixels needs to be about 30 $\mu$m in order to cover the data line and the region between the data line and the pixel.

When it is assumed that a pitch in a direction of the gate line of the picture element is about 600 $\mu$m, the black matrix between the picture elements has width of $L_{BM}$ of 330 $\mu$m, and BM between the pixels has width Ls of 30 $\mu$m, an optical transmission region of the pixel in a direction of the gate line has length Lp of 70 $\mu$m, a ratio of portions where light passes through becomes small, and light transmittance of the liquid crystal display device becomes small.

When the liquid crystal display device has a large screen by directly connecting liquid crystal panels in parallel to each other and a yield of the respective liquid crystal panels or switching array substrates to be connected is different, a total yield of the liquid crystal display device as the whole is limited to a yield of a substrate having the lowest yield.

Furthermore, the respective liquid crystal panels have individual differences in display characteristics and, therefore, there is a problem that flexibility of combining switching array substrates having a small difference in characteristics is lowered when a direction of the switching array substrates to be connected is specified.

It is conspicuous that a quantity of display information on the display device tends to increase. In addition, in order to deal with the increase of a quantity of display information, a display device having a larger screen and higher resolution is being demanded.

However, the liquid crystal display device has a disadvantage that writing time for driving the liquid crystal becomes short when the liquid crystal display device has higher resolution. Additionally, when the display screen is made larger, the pixel and the data line have an increased capacitance, and a wave profile of the data signal being dull. Thus, the data signal cannot be applied completely to respective pixels, and a contrast of displaying image is degraded.

SUMMARY OF THE INVENTION

The invention was achieved to remedy the problems described above. Specifically, it is an object of the present invention to provide a liquid crystal display device, which has a large display screen and outstanding display quality.

It is also an object of the invention to provide a liquid crystal display device, which has high flexibility of combination to connect a plurality of liquid crystal panels and high productivity with easy connection to external circuits.

It is another object of the invention to provide a liquid crystal display device having a high aperture ratio.

The present invention can also provide a liquid crystal display device, which has a large display screen capable of displaying images with high resolution and contrast. It is also an object of the invention to substantially decrease time of writing data signals into pixels and to improve writing characteristics.

To remedy the problems described above, the present invention employs those configurations as described below.

In order to prevent the connecting region of the of liquid crystal panels from being recognized as the non-display region, it is necessary to make the connecting region of the liquid crystal panels smaller. For example, it is necessary to reduce the connecting region thin to about a level of resolution of eyes of the observer. Further, it is most desirable to have conditions that a pitch of arranging pixels adjacent to extend over the connecting region is equal to that of arranging pixels in the individual liquid crystal panel.

The first aspect of the liquid crystal display device according to the present invention is to comprises, a first substrate formed of a plurality of insulating substrates, the insulating substrates being tiled to form the first substrate, a matrix array of picture elements formed on the first substrate, at least one pixel electrode arranged in respective picture elements, the matrix array of the picture elements comprising first picture elements and second picture elements, inside respective insulating substrates the first picture elements and the second picture elements arranged alternately at least in a direction perpendicular to a boundary (line) of tiled insulating substrates, and the first picture elements adjacent intervening the boundary; a second substrate having at least a counter electrode, the counter electrode opposed to a region where the matrix array of the picture elements is formed; at least a liquid crystal layer interposed between the first substrate and the second substrate; and a light shielding layer formed on one of the first substrate and the second substrate, and the light shielding layer shields a region intervened between the first picture elements.

It is preferable that a distance between the first picture elements adjacent intervening the boundary is substantially equal to a distance between the first picture elements adjacent in a direction perpendicular to the boundary inside the respective insulating substrates. Thus, an arrangement pitch of the first picture elements contributing to displaying becomes substantially equal over the entire display screen, thereby enabling to prevent the tiled portions of the substrates from being recognized as disturbing lines.

In the liquid crystal display device of the invention, it is preferable that the insulating substrates have first data lines supplying data signals to the pixel electrodes of the first picture element and second data lines supplying the data signals to the pixel electrodes of the second picture element, the first data lines having first connecting portions on a first side of the insulating substrate, the second data lines having second connecting portions on a second side of the insulating substrate opposed to the first side. By configuring in this way, driver ICs can be connected to one side of the substrates, and the liquid crystal display device can be made compact. Productivity of the liquid crystal display device can also be improved.

The liquid crystal display device of the invention can exchange the first picture elements and the second picture elements by changing a direction to tile a plurality of switching array substrates which form the first substrate. Accordingly, it is preferable to change a direction of tiling the switching array substrates according to circumstances that defective pixels are caused. For example, a plurality of switching array substrates can be combined so that the number of defected pixel electrodes included in the first picture element is equal to or less than the number of defected pixel electrodes included in the second picture element.

The second substrates may be formed by tiling or formed of a single substrate corresponding to the first substrate. Where the second substrate is formed by tiling, the counter electrode may be divided corresponding to the tiled insulating substrates. The counter electrode may be further divided into smaller parts.

The liquid crystal display device of the present invention comprises a first substrate which is formed of a plurality of connected insulating substrates and has picture elements arranged in a matrix form on the plurality of insulating substrates and a plurality of pixel electrodes arranged in parallel in the picture elements, a second substrate having a counter electrode, and a liquid crystal layer intervened between the first substrate and the second substrate, wherein the picture elements comprise first picture elements arranged in every other columns from both sides of a connecting boundary of the plurality of insulating substrates and second picture elements arranged alternately with the first picture elements in the insulating substrates, and light shielding means is further disposed, which is formed on one of the first substrate and the second substrate and shields a region between the first picture elements at least adjacent to each other.

The insulating substrates have first data lines supplying data signals to the pixel electrodes of the first picture element and second data lines supplying data signals to the pixel electrodes of the second picture element, and the first data lines and the second data lines may be lead to a different side of the insulating substrates. For example, a region along two opposite sides of one insulating substrate may be connected to the first data lines and the second data lines.

Specifically, the liquid crystal display device of the present invention is a liquid crystal display device having picture elements, which are arranged two dimensionally in a matrix form at equal pitches. A composite switching array substrate (first substrate) is formed by connecting side faces of a plurality of switching array substrates having pixel electrodes. Thus, a display screen can be made large, and connection of the switching array substrates or the liquid crystal panels is facilitated by having a redundant pixel electrodes (pixel electrodes configuring the second picture elements) which do not serve for displaying images.

The second picture element is coated with a light shielding layer such as a black matrix. A width of the light shielding layer in a direction perpendicular to the connecting boundary is approximately equal to a width of one picture element in a direction perpendicular to the connecting boundary. RGB color filters are disposed on the respective pixel electrodes of the first picture element used for displaying images. Electrical signals are applied through leads connected to the pixels used for displaying images.

First picture elements are always disposed on both sides of the connecting boundary of a plurality of tiled substrates. An arrangement pitch of the first picture elements in a single switching array substrate is approximately equal to an arrangement pitch of the first picture elements extending over a plurality of switching array substrates. Accordingly, all the picture elements (first picture elements) of the display screen of the liquid crystal display device of the present invention are arranged with substantially an equal pitch in the display region integrally formed to spread over the plurality of substrates.

The equal pitch means a pitch to be equal in a direction along the data line or the scanning line, and their pitch may have a different in one of those directions.

A width of the connecting region required to connect in parallel a plurality of switching array substrates or liquid crystal panels is a sum of a sealing width required for sealing the liquid crystal and a connection width for connecting the switching array substrates. A margin required for connection is desired that a total of the sealing width and the connection width is equal to or different within an extent of about 10% from a width in a direction perpendicular to the connection boundary of one picture element. The picture elements adjacent along the connection boundary of the switching array substrate are also required to be the first picture elements used for displaying images. These points are also applied to the connection of a plurality of liquid crystal display panels.

An image is displayed by electrically controlling orientation of the liquid crystal in respective pixels. Each pixel comprises a pixel electrode, a counter electrode and a liquid crystal layer interposed between them. Color displaying can be obtained by forming one picture element with three pixels in correspondence with primary colors such as RGB or CMY. The pixels forming the picture element are not limited to three but may be two or four or more.

The first picture elements serving for displaying are arranged in every two columns from both sides of connecting boundary along the connecting boundary of the plurality of connected switching array substrates. The redundant second picture elements are arranged alternately with the first picture elements in the individual connected switching array substrate. The second picture elements are shielded by light shielding means and do not serve for actual displaying images. However, the redundant second picture element serves to improve flexibility of combining the switching array substrates.

Leader line parts connected to the data lines are arranged on the periphery of the display region of the substrate to supply analog or digital data signals to the respective pixel electrodes. The leader line parts are preferably arranged commonly or symmetrically with respect to top and bottom or right and left of the substrate. Thus, whichever of two or more sets of picture element columns alternately arranged on the individual switching array substrate is used as the first picture element, the data lines can be lead collectively to one side of the substrate.

When the liquid crystal panel is made to have a common structure without distinction between the connecting face and the leader line part, the liquid crystal panels can be connected to either sides, right or left. Accordingly, even if the produced liquid crystal panel had a defective pixel or a defective line, a direction in that the substrates are connected can be selected to include the defective pixel into a picture element, which does not serve for displaying images. Specifically, the first picture element and the second picture element can be exchanged depending on a situation that the defective pixel is caused. Accordingly, even an switching array substrate or liquid crystal panel having pixels with some defects can be used, and productivity can be improved remarkably.

Directions of wire leads to the pixel electrodes are preferably made in symmetry for the first picture element and the second picture element. Thus, the leader line part to the pixel electrode used for displaying can be prevented from being present together with the leader line part to the pixel electrode not used for displaying images. Then, a driver IC having the driver integrated can be installed on one side of the substrate.

By commonly using some wiring among the pixel electrodes contained in the picture element, an aperture ratio is prevented from being lowered, and parasitic capacitance can be prevented from increasing.

As described above, the liquid crystal display device of the invention has a display screen formed of a large switching array substrate by tiling a plurality of substrates and an arrangement pitch of the first picture element determined according to a tiling margin of the plurality of substrates. Therefore, the arrangement pitch of the picture elements becomes large, however the liquid crystal display of the invention uses the region between the first picture elements to improve its display quality and productivity. Especially, the present invention has completed to provide a large screen and a high display quality simultaneously, which are hard to be achieved.

The liquid crystal display device of the invention described above has a width of a light shielding layer for shielding a joint region of a plurality of substrates determined to be approximately equal to a width of the light shielding layer for shielding a region intervened between a substrate and another substrate. A second picture element which is redundant is arranged between the first picture elements which are adjust to each other in a substrate. By configuring as described above, productivity of the liquid crystal display device can be improved.

As described afterward, a plurality of data lines may be disposed collectively instead of the second picture element between the adjacent first picture elements. Besides, a data driver or a logic circuit such as a D/A converter for converting a digital data signal into an analog data signal (voltage) may be formed. In such a case, the region between the adjacent first picture elements is preferably shielded by light shielding layer.

The second aspect of the liquid crystal display device according to the present invention is to comprises, a first substrate formed of a plurality of insulating substrates, the insulating substrate being tiled to form the first substrate, a matrix array of picture elements formed on the first substrate, at least one pixel electrode arranged in respective picture elements, the first substrate having signal lines supplying data signals, switching elements intervened between the pixel electrodes and the signal lines, and the switching elements applies the data signals to the pixel electrodes, and a width of respective picture elements perpendicular to a boundary of tiled insulating substrates is almost equal to a width perpendicular to the boundary of the region intervened between adjacent picture elements; a second substrate having at least a counter electrode, the counter electrode opposed to a region where the matrix array of the picture elements is formed; at least a liquid crystal layer interposed between the first substrate and the second substrate; and a light shielding layer formed on one of the first substrate and the second substrate, and the light shielding layer shields a region intervened between the picture elements.

The liquid crystal display device of the invention has the data lines selectively formed in a region intervened between the picture elements. For example, where one picture element is formed of three pixel electrodes, three data lines for supplying data signals to the three pixel electrodes may be formed in a region intervened between the adjacent picture elements. In other words, any data line is not formed between a plurality of pixel electrodes of one picture element. The region between the picture elements where a plurality of data lines are formed in parallel is shielded by a light shielding layer such as a black matrix (BM).

By configuring as described above, the region, where the data lines can be formed, can be formed wider as compared with a conventional liquid crystal display device. The liquid crystal display device of the invention is desired to form the data lines collectively and also widely. When the data lines have a large width, a wiring resistance can be decreased. Accordingly, the data signals can be satisfactorily written into the respective pixel electrodes even when the display screen is large. The data line has preferably a width more than ten times larger than the wiring width for connecting the data line and the pixel electrode.

As described above, it is assumed that the picture element has three pixel electrodes and the three data lines are formed in a region between the adjacent picture elements. It is preferable that one of the three pixel electrodes in the picture element is connected with one of the three data lines at the first side of the picture element, and the other two of the three pixel electrodes in the picture element are connected to the other two of the three data lines at the second side opposed to the first side. By configuring as described above, overlaying of wiring for connecting the data line and the pixel electrode can be reduced. Therefore, productivity and reliability of the liquid crystal display device are improved. Besides, since the capacitance parasitic on the pixel can be made small, the display quality can be improved.

In the liquid crystal display device described above, the data line may be formed to extend over the plurality of insulating substrates, which are tiled to each other. Thus, the number of pixel electrodes connected to one data line is increased. Since the present invention can collectively arrange the data lines between the picture elements, a width of the data line can be formed substantially larger than in a conventional liquid crystal display device.

Where a plurality of switching array substrates are tiled to each other, a margin required for tiling is about 700 to 800 $\mu$m. Meanwhile, a data line of an ordinary liquid crystal display device has a width of about 5 to 10 $\mu$m. In the liquid crystal display device of the invention, a width between the picture elements serving for displaying is substantially equal to a tiling margin. Accordingly, the data line can be made to have a width substantially larger than before.

Therefore, the liquid crystal display device of the invention has the data line with a decreased resistance, and the number of pixel electrodes drivable by a single data line can be increased. Degradation of a wave profile of the data signal can be reduced, so that display quality is improved. When the data line can be made to have a large sectional area, its resistance is decreased. However, since the switching array substrate of the liquid crystal display device is formed by a film accumulation process, productivity is degraded when the thickness of the data line is increased. Therefore, the liquid crystal display device of the invention is configured to decrease the resistance of the data line by increasing a width of the data line.

For example, the liquid crystal display device of the invention further comprises conductor wiring for connecting the data lines and the switching elements, and the data line may be determined to have a width more than ten times larger than a width of the conductor wiring. When a width of the wiring connected to the switching element is increased in correspondence with the increase of the width of the data line, the parasitic capacitance of the pixel is increased. A width of the wiring connected to the switching element includes, for example, a width of source and drain electrodes and a channel width of a thin film transistor. When the parasitic capacitance increases, a data signal voltage is not correctly applied to the pixel electrodes due to an effect of a feed through voltage. In other words, the display quality defected by the increase of the parasitic capacitance. When the thin film transistor is large, the parasitic capacitance increases. Therefore, the liquid crystal display device of the invention, which has a large data line, preferably uses a thin film transistor capable of supplying a current of the same level as before.

It is assumed that the data line has a length of about 1 m and wiring from the data line to the pixel electrode has a length of about 1 mm. In addition, when a width Wsig. of the data line is determined to 10 times of a width WTFT of wiring from the data line to the pixel electrode, an effect of the parasitic capacitance of the pixel can be suppressed to about 1%.

Thus, in the liquid crystal display device of the invention, the data line has its parasitic capacitance lowered by decreasing a width of the conductor pattern between the data line and the pixel electrode.

When the width of the data line is increased, a frequency of the data signal can be increased. Accordingly, even a liquid crystal display device having a larger screen and higher resolution can have an improved display quality.

Thus, the liquid crystal display device of the invention is provided with a large screen by connecting a plurality of switching array substrates or a plurality of liquid crystal display panels. Besides, to prevent a connecting region, which is a non-display region, from being visually recognized, transmittance of light is prevented from being lowered by increasing a width of BM more than required in the display region other than the connecting region, thereby enabling to improve an aperture ratio substantially.

The liquid crystal display device of the invention in that a logic circuit is formed in a region intervened between the picture elements adjacent to each other in one substrate will be described.

The liquid crystal display device according to a third aspect of the invention comprises a first substrate having a matrix array of picture elements; at least a pixel electrode arranged in respective picture elements; at least a logic circuit supplying data signals to the picture elements, and the logic circuit formed on a region intervened between the picture elements; a second substrate having at least a counter electrode, the counter electrode opposed to a region where the matrix array is formed; at least a liquid crystal layer interposed between the first substrate and the second substrate, and a light shielding layer formed on one of the first substrate and the second substrate, and the light shielding layer shields a region intervened between the picture elements.

The respective picture elements may be formed of one pixel electrode or a plurality of pixel electrodes. The logic circuit may be formed for each picture element, or for a matrix in part of the matrix array of the picture elements. As the logic circuit, the same configuration as the data driver may be used. Specifically, the matrix array of the picture elements may be divided into a plurality of partial matrices to arrange the data driver for each divided matrix. By configuring as described above, the number of pixel electrodes driven by one data driver can be decreased. The number of pixel electrodes connected to one data line can be also decreased. Therefore, the display quality of the liquid crystal display device having a large display screen or high resolution can be improved.

The logic circuit may be provided with at least a D/A converter. By adding the D/A converter, a digital data signal can be applied from the source of data signals to the logic circuit. The D/A converter may produce an analog voltage level corresponding to the digital data signal and apply to the pixel electrode. Additionally to the D/A converter, the logic circuit may be a shift register, a data latch, a digital comparator, a flip-flop and the like. Additionally, another device may be used as required. An analog circuit may be also combined together.

When the digital signal is applied through the data line, amplitude of the signal can be made small as compared with a case of applying an analog data signal voltage. When it is assumed that a liquid crystal display device has its power consumption, drive frequency, capacitance and drive voltage denoted by W, f, C and V respectively, the power consumption can be expressed as $W = f \times C \times V^2$. Therefore, when an analog signal has voltage amplitude of about 5V and a corresponding digital data signal has voltage amplitude of about 1V, the power consumption can be decreased to about $\frac{1}{25}$.

The liquid crystal display device of the invention having such a logic circuit in a region intervened between the picture elements can be suitably combined with the liquid crystal display device of the invention having a large screen by tiling a plurality of substrates as described above.

Especially, when a digital data signal is supplied to the data line, the display quality can be prevented from being degraded even when the display screen is large and the data line is long.

The liquid crystal display device of the invention may also comprise a first substrate, which comprise a plurality of tiled insulating substrates, picture elements arranged in a matrix form to extend over the plurality of insulating substrates, a plurality of pixel electrodes arranged in parallel in the picture elements, switching elements arranged in connection with the pixel electrodes in the picture elements, and a logic circuit for supplying data signals to the pixel electrodes through the switching elements; a second substrate having a counter electrode; a liquid crystal layer interposed between the first substrate and the second substrate; and light shielding means, which is formed on one of the first substrate and the second substrate and shields a region intervened between the adjacent picture elements at substantially the same pitch as a width of the picture element in a direction of the connecting boundary of the picture elements in parallel to a direction of the connecting boundary.

The logic circuit may be a shift register, a data latch, a digital comparator, a flip-flop and the like. A data driver or a D/A converter, which converts a digital data signal into an analog voltage corresponding to the data signal, may be arranged on the periphery of the display region.

Furthermore, the logic circuit or the data processing circuit may be formed of a thin film transistor, which has a semiconductor film made of a-Si (amorphous silicon) as channel. It may be also formed of a thin film transistor, which has as the channel a semiconductor film made of poly-Si (polycrystalline silicon) or μc-Si (micro-crystalline silicon), having a large carrier travel. Additionally, the latter provides an improved switching rate. Besides, it is more preferable because the latter can be formed integrally on the substrate and the thin film transistor array for selecting the pixels connected to the pixel electrodes.

As described above, by having a data signal processing part which holds the data signal for each picture element and supplies to the pixel electrode and configuring the pixel signal processing part by a poly-silicon TFT capable of effecting high-speed switching, data can be transferred to the pixels at a high speed. In this case, a data signal voltage is applied to the pixel electrodes in the picture elements after processing in the data signal processing part. For example, when processing in the data signal processing part is performed in a ½ field time, the remaining ½ field can be assigned as a writing time. Accordingly, when a liquid crystal display device having a large capacitance is driven, a writing time can be made longer, and display quality can be improved substantially.

Such a logic circuit may comprise D/A conversion means for converting a digital data signal into an analog signal which is applied to the pixel electrodes with respect to picture elements arranged in respective columns, holding means such as a data latch for holding the digital data signal, and control means such as a shift register for controlling the entry of the data signal into the holding means. In addition, the transmission of the data signal may be made on the pixels arranged in respective columns by such a data signal processing part.

By configuring a structure described above, the data signal can be supplied to the pixel electrodes arranged in respective columns. This is effective when windows for movies are shown on screen. Because, when a movie and a still pictures are shown simultaneously, pixels which require rewriting and those which do not require rewriting are present together among the groups of pixels in respective rows of matrix array. For example, the group of pixels in a column to which the pixels requiring rewriting is rewritten in the data latch part, and the group of pixels in the other column is stopped from having the data signal transmitted. Thus, the data traffic is decreased, and the power consumption can be reduced.

Also, the D/A processing part in the data signal processing part may be formed of, for example, a buffer circuit for supplying voltage having positive polarity and a buffer circuit for supplying voltage having negative polarity. Levels of those voltage are corresponding to respective data signals. Besides, polarity of the data signals applied to the pixel electrode may be inverted by a selector part disposed between the pixel electrode and the buffer circuit.

By configuring as described above, voltage having a positive polarity and negative polarity applied to the pixel electrode can be generated by a single transfer of the data signal. Therefore, operations of data transmission for every polarity inversion can be decreased. Therefore, the power consumption can be reduced substantially. In this case, a method for the polarity inversion is preferably performed not to cause degradation of a display quality such as a flicker by inverting for every row or column.

Additionally, the logic circuit may have, for example, a D/A processing part for converting the digital data signal into the analog signal to be applied to the pixel electrode, a color conversion matrix part for converting luminance and color difference signals into digital data signals, a data latch part for recording the luminance and color difference signals, and a shift register part for controlling the entry of data signal into the data latch part.

Thus, a display device integrally composed of the display part with a system for directly transmitting Y/C signals such as NTSC signals to the pixels and converting into RGB signals by a color conversion matrix part can be configured.

The liquid crystal display device of the invention also comprises a first substrate having at least an insulating surface, pixel electrodes arranged in a matrix form on the first substrate, means which are arranged in a plurality between rows or columns of the pixel electrodes to divide the pixel electrodes arranged in the matrix form into a plurality of regions and supply the data signal to the pixel electrodes for each of the divided regions, and a switching element for selectively supplying the data signal to the pixel electrodes.

In other words, this liquid crystal display device has the data driver, which is generally arranged in the periphery of the display region, arranged in the display region for each block of the divided pixels.

The number of blocks formed by dividing the matrix array of the pixel electrodes may be determined depending on a size of the display screen as the whole. For example, where the matrix array of the pixel electrodes is divided into n blocks, writing time can be made longer to n times. Therefore, large liquid crystal display device having a large capacitance can have an improved contrast and a substantially improved display quality.

Furthermore, even when the display screen is large in size, the data line can be made shorter, and waveform degradation of the data signals can be reduced.

Besides, respective data driver formed in the display region may be provided with at least a D/A converter.

Specifically, a matrix array of the pixel electrodes is divided into a plurality of blocks in a direction of rows. The data driver may be configured basically to have a D/A processing part that converts the digital data signal into an analog signal to be applied to the pixel electrodes in each block, a data latch part for storing the digital data signal, and a shift register part for controlling the entry of data signal into the data latch part. The region where the logic circuit formed is preferably provided with a light shielding layer in order to make the circuit invisible on the display screen.

The liquid crystal display device of the invention configured as described above may be applied to a liquid crystal display device having a display screen configured by tiling a plurality of switching array substrates or liquid crystal panels described above.

The liquid crystal display device having at least a logic circuit in a region intervened between the adjacent picture elements can be combined with a liquid crystal display device having a tiled structure. In the case, signal processing circuits for processing data signals can be disposed respective columns elongated with a boundary of tiled switching array substrate. After a data signal voltage corresponding to the data signal is generated in the data signal processing circuit, the data signal voltage is applied to the pixel electrode of the picture element through the switching element for selecting the pixel electrode.

Thus, the data can be transmitted to the data signal processing part with as a digital data, and the processing part can be composed of a digital circuit. Therefore, a time required for processing can be decreased substantially. Even when the display screen is large, a period to apply the analog signal voltage, which is corresponding to the data signal, to each pixel electrode can be long enough. Besides, by shielding the logic circuit such as the data signal processing part formed in the display screen, a contrast can be prevent from the degradation due to a transmission of light through a region except the aperture of the picture elements.

The logic circuit such as the data signal processing part may be arranged for respective columns of those picture elements arranged in the column in order to transmit the data signal to the pixel electrodes of the picture elements.

Thus, the liquid crystal display device having a display screen formed by tiling a plurality of switching array substrates or liquid crystal panels can transfer data to the pixels arranged in those columns. Accordingly, a period for applying the data signal to the pixel electrode can be made long enough. Thus, the data signal can be completely applied to respective pixels when the display screen is large in size. A buffer circuit capable of supplying voltage having a positive polarity and voltage having a negative polarity can be employed in a tiled type liquid crystal display device which has a display screen formed by connecting a plurality of switching array substrates or liquid crystal panels with their sides. An inversion of polarity of voltage corresponding to the data signals can be carried by the select the circuit disposed between the buffer circuits and the pixel electrodes.

If the displayed image is, for example, a still image, the transmission of the display signal can be stopped mean while that the holding voltage of the buffer circuit does not change largely due to a current leak. As a result, the power consumption can be reduced.

The tiled type liquid crystal display device which has a display screen formed by connecting a plurality of switching array substrates or liquid crystal panels with their sides can also have luminance and color difference signals (hereinafter called as Y/C signal) as the image data to the signal processing circuit provided for each picture element or each column of picture elements. Then, the Y/C signal is converted into a digital data signal (hereinafter called as RGB signal) by the color conversion matrix part in the signal processing circuit. In this case, the Y/C signal is a composite signal of at least two adjacent picture elements. For example, RGB signals for the right and the left picture elements of the signal processing circuits, may be generated from the Y/C signal. Also, RGB signals for those picture elements surrounds the signal processing circuit in every direction may be generated from the Y/C signal.

Those decentralized arrangement of the data drivers in the display screen may be applied to the liquid crystal display device of the invention which has a single display screen configured by connecting a plurality of switching array substrates or liquid crystal panels with their sides. Specifically, the liquid crystal display device may have a data driver which basically comprises a D/A processing part which divides the pixel electrodes arranged in a matrix form in the display region into at least two or more blocks and converts the digital data signal into an analog signal to be applied to the pixel electrodes for each block, a data latch part for recording the digital data signal, and a shift register part for controlling the entry of data signals into the data latch part. In this case, by dividing into n blocks, writing time can be extended to n times, and high dissolution display can be made.

DESCRIPTION OF THE PREFERRED EMBODIMENTS

The liquid crystal display device of the invention will be described in further detail below.
Embodiment 1

Figure 1:
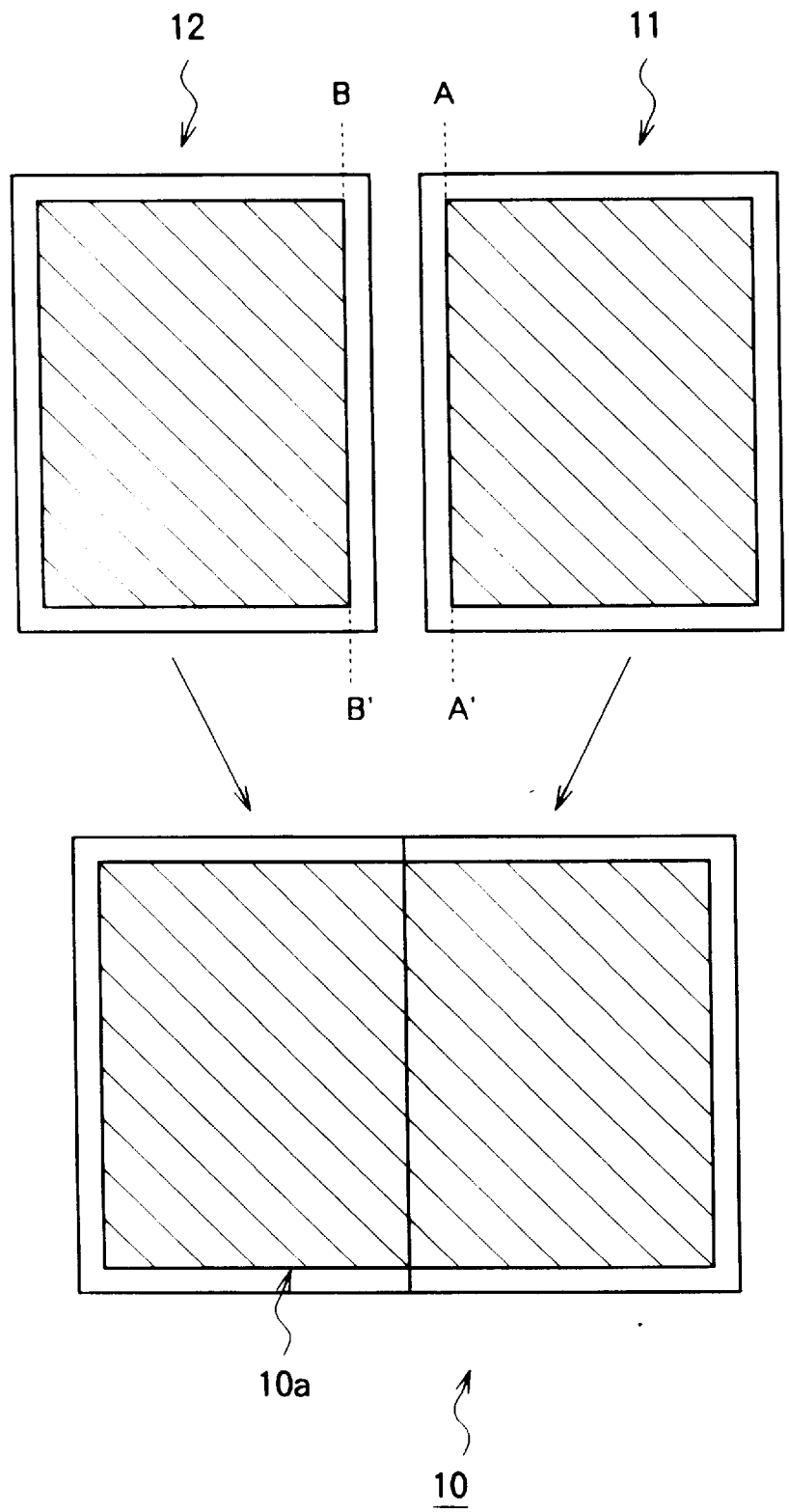
FIG. 1 is a schematic diagram showing a structure of the liquid crystal display device of the invention.

FIG. 1 is a schematic diagram showing a structure of the liquid crystal display device of the invention.

A liquid crystal display device 10 has two liquid crystal panels 11, 12 connected to integrally form a continuous display screen 10a.

The liquid crystal panels 11, 12 have a liquid crystal layer interposed between switching array substrates 11a, 12a, which have pixel electrodes 22 formed into a matrix, and a counter substrate, on which counter electrodes are disposed. Images are displayed by two-dimensionally modulating (penetrating, dispersing, absorbing, etc.) light entering into the liquid crystal layer (the counter electrodes, the counter substrate and the liquid crystal layer are not shown). The two liquid crystal panels 11, 12 are cut their envelope margins along a line A-A' and a line B-B' respectively and have the cut edges connected to each other to form a large display screen.

Figure 2:
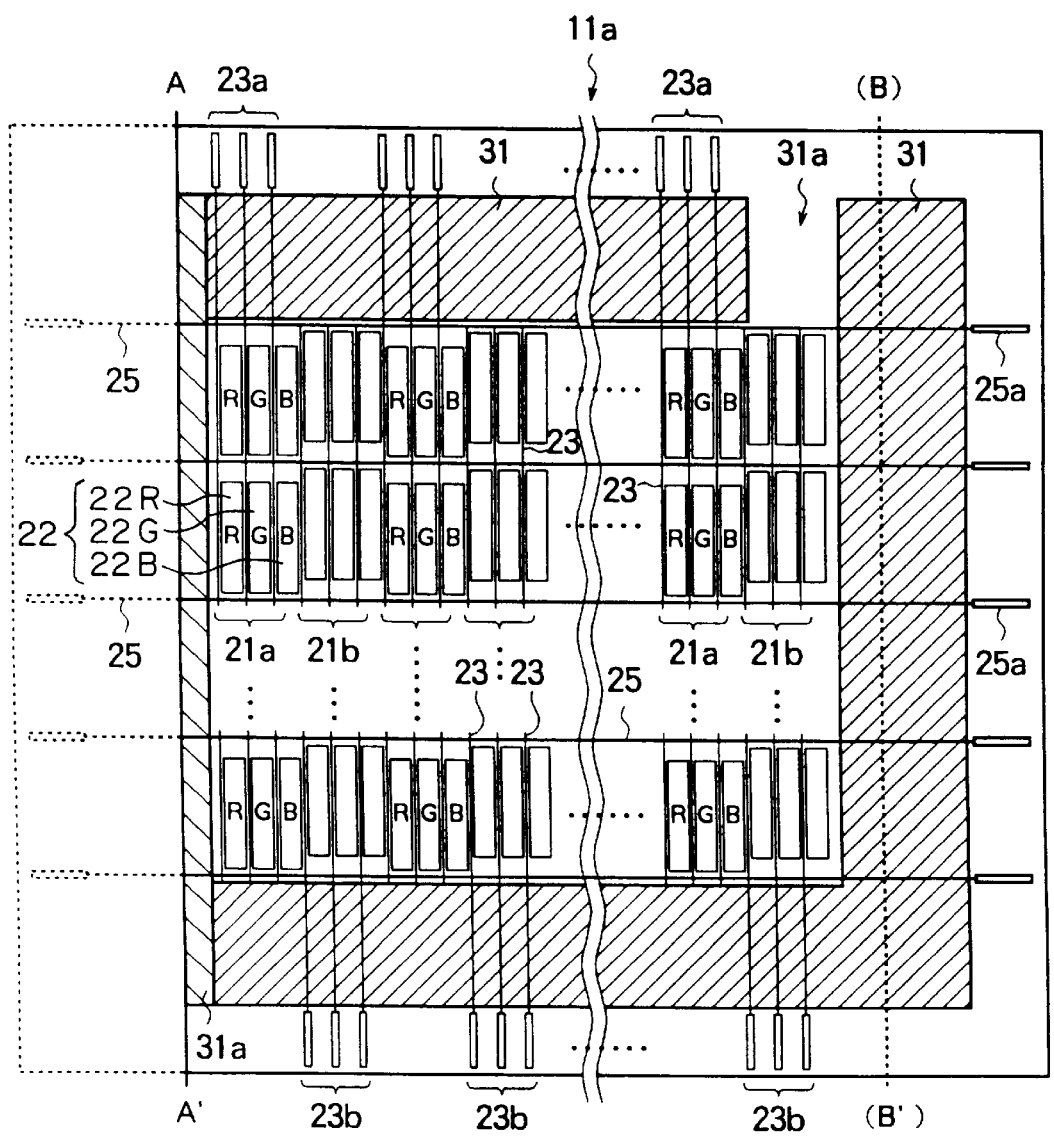
FIG. 2 is a schematic diagram showing a structure of an switching array substrate of one liquid crystal panel in the liquid crystal display device of the invention shown in FIG. 1.

FIG. 2 is a schematic diagram showing a configuration of the switching array substrate of the liquid crystal panel 11, which is connected to the right side in the liquid crystal display device shown in FIG. 1.

Figure 3:
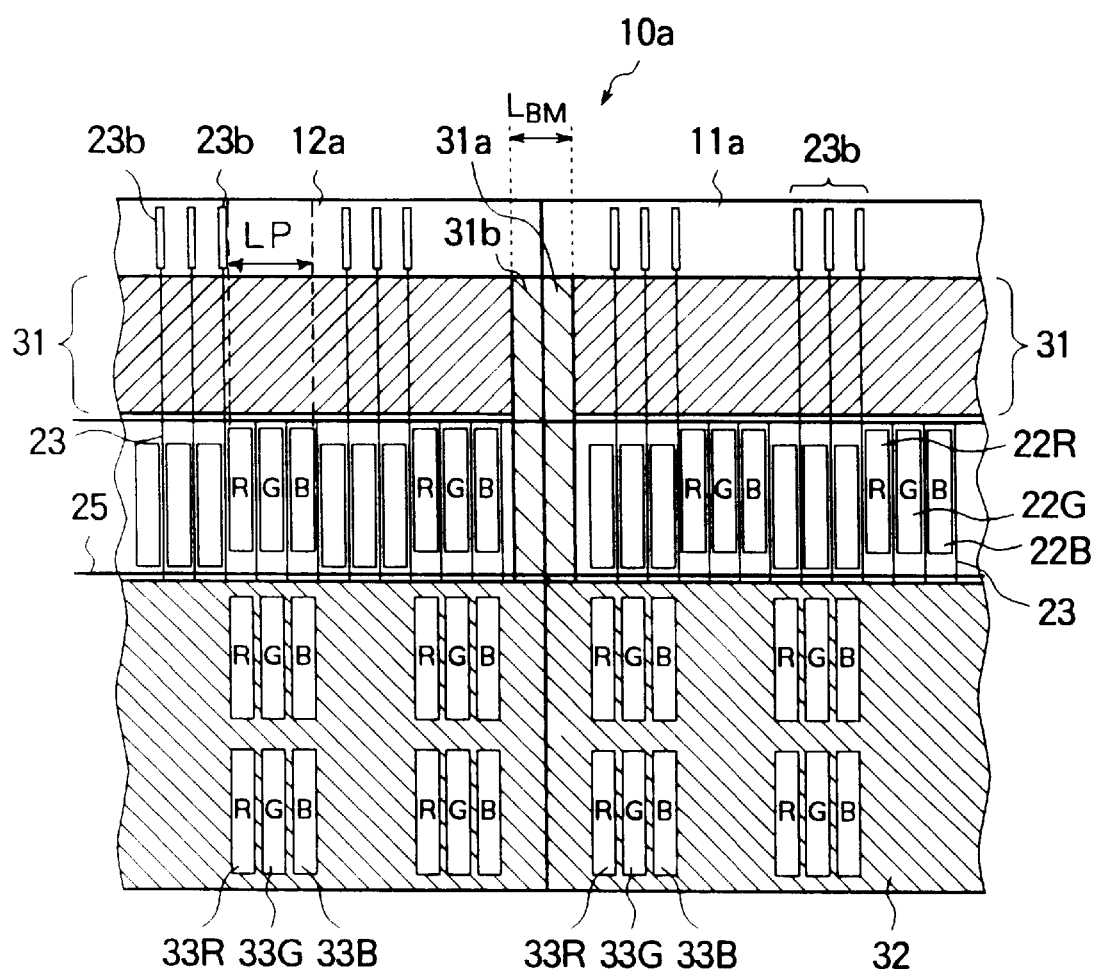
FIG. 3 is an enlarged schematic diagram of a structure of a connecting portion of switching array substrates configuring the liquid crystal display device of the invention.
Figure 4:
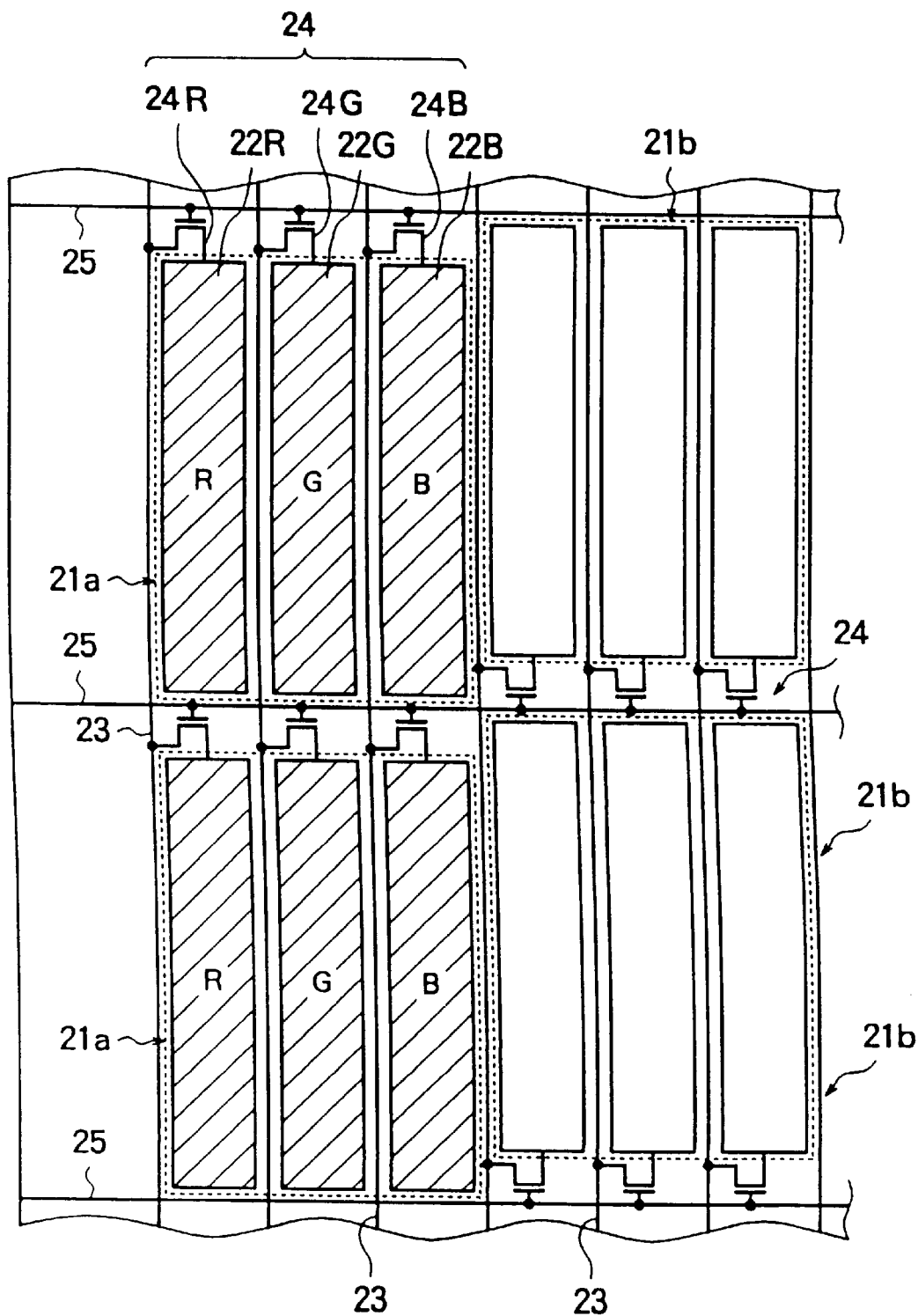
FIG. 4 is an enlarged schematic diagram showing a structure of picture elements of the liquid crystal display device of the invention.

FIG. 3 is a schematic diagram showing in an enlarged scale a configuration of the connected section of the switching array substrate 10a configuring the liquid crystal display device according to the invention. FIG. 4 is a schematic diagram showing in an enlarged scale the configuration of picture elements. FIG. 3 shows a positional relationship among the switching array substrates 11a, 12a on which the pixel electrodes 22 and thin film transistors 24 are formed, a black matrix 32 and a color filter 33 in the neighborhood of the connected section of the liquid crystal panels 11, 12.

A plurality of pixel electrodes 22 are disposed in parallel in respective picture elements 21a, 21b. It is configured to enable color display. Each of picture elements 21a, 21b has the pixel electrodes 22, which have a pixel electrode 22R to which a red data signal is applied, a pixel electrode 22G to which a green data signal is applied and a pixel electrode 22B to which a blue data signal is applied, disposed in parallel in an insulated state to one another. Thin film transistors 24R, 24G, 24B are connected to these pixel electrodes 22R, 22G, 22B. Data signals supplied by these thin film transistors 24 through data lines 23 are selectively applied to the pixel electrodes 22. Additionally, color filters 33R, 33G, 33B corresponding to the respective colors are disposed in areas corresponding to the pixel electrodes 22R, 22G, 22B.

A channel of the thin film transistor 24 is formed of a semiconductor film consisting of a-Si (amorphous silicon), however a semiconductor film consisting of poly-Si (polycrystalline silicon) or μc-Si (crystallite silicon) can also be employed. Additionally, a two-terminal type non-linear switching element such as MIM may be used instead of the thin film transistor.

The display region of the liquid crystal display device 10 has the first picture elements 21a which are arranged at every other pitch from either side of a boundary (connecting line) connecting the plurality of switching array substrates 11a, 12a and the second picture elements 21b which are arranged alternately with the first picture elements 21a in the respective switching array substrates 11a, 12a.

The first picture element 21a of the switching array substrate 11a and the second picture element 21b of the switching array substrate 12a which are arranged with the connecting boundary therebetween are disposed to have an equal arrangement pitch in the respective switching array substrates 11a, 12a and over the entire display screen. Specifically, the first picture elements 21a are formed into a matrix on the connected switching array substrates 11a, 12a. The arrangement pitch in a direction (a scanning line direction) perpendicular to the connecting boundary A-A' is made at a pitch substantially equal to a width of the first picture element 21a and the second picture element 21b in the scanning line direction. Different from the arrangement pitch in the direction perpendicular to the connecting boundary A-A', however, an arrangement pitch in a direction (a data line direction) of the connecting boundary A-A' is also substantially equal over the connected substrates as the whole.

On at least one of the switching array substrate 11a or a counter substrate (not shown), the black matrix 32 is disposed as shielding means for shielding a space between the pixel electrodes 22 adjacent in the first picture element 21a and the second picture element 21b and a region between the first picture elements 21a over the two tiled switching array substrates 11a, 12a as the whole.

In the liquid crystal display device according to the present invention, only the pixel electrodes 22 configuring the first picture element 21a are contribute for displaying images. Thus, the picture elements as a display configuring unit have an equal arrangement pitch over the display screen as the whole. The connecting portion is made invisible. In other words, the second picture element 21b is a redundant picture element not serving for displaying images. Also, the pixel electrode 22 configuring this picture element is a redundant pixel electrode not used for displaying images.

FIG. 4 is an enlarged schematic diagram showing a configuration of the picture element.

Multiple pixel electrodes 22 are arranged in parallel in the respective picture elements 21a, 21b. In each of the picture elements 21a, 21b, the pixel electrodes 22, which have a pixel electrode 22R to which a red data signal is applied, a pixel electrode 22G to which a green data signal is applied and a pixel electrode 22B to which a blue data signal is applied, are arranged in parallel in an insulated state to one another. Areas corresponding to these pixel electrodes 22R, 22G, 22B have color filters (not shown) corresponding to their respective colors.

Data lines 23 are arranged in parallel to the connecting boundary A-A' (B-B') between the respective pixel electrodes 22. A data signal is supplied to the data lines 23 from an unillustrated data driver or the like. This data signal is applied to the pixel electrodes 22 selected by a switching element, for example, the thin film transistors 24, connected to the respective pixel electrodes 22. Specifically, the thin film transistors 24 are turned on or off by a scanning signal supplied to the gate electrodes 24g of the thin film transistors 24 by an unillustrated scanning driver through a scanning line 25. When the thin film transistor 24 is turned on, a voltage level of the analogue data signal being supplied to the data line 23 is selected and applied to the pixel electrode 22. The liquid crystal layer responds to an electric field formed between the pixel electrode 22 and an unillustrated counter electrode, and the light entering into the liquid crystal layer is modulated two-dimensionally, therefore images are displayed on the screen.

Three pixel electrodes 22R, 22G, 22B are disposed on each of the first picture element 21a and the second picture element 21b. In this liquid crystal display device shown, the data line 23 connected to the pixel electrode 22 arranged on the first picture element 21a and the data line 23 connected to the pixel electrode 22 arranged on the second picture element 21b are leaded to a different side of the switching array substrate. Specifically, the data line 23 connected to the pixel electrode 22 configuring the first picture element 21a is guided to an upper part in the drawing. Meanwhile, the data line 23 connected to the pixel electrode 22 configuring the second picture element 21b is guided to a lower part in the drawing. The respective data lines are connected to the data driver through data line pads 23a, 23b. Therefore, they can be connected selectively to the data line 23 connected to the pixel electrode 22 configuring the first picture element 21a on one side of the switching array substrate.

In addition, the scanning line 25 is held in common by the first picture element 21a and the second picture element 21b and guided to the outer periphery of the substrate on the opposite side of the connecting boundary.

A seal region 31 is formed to surround the display region where the pixel electrodes 22 are formed in a matrix so to seal the liquid crystal materials. The seal region 31 has a seal region 31a along the connecting boundary A-A' of the liquid crystal panel 11 and a seal region 31b along the connecting boundary A-A' of the liquid crystal panel 12, which are arranged so that the overall width becomes approximately equal to an arrangement pitch in a direction of the scanning line 25 of the first picture elements 21a of the respective switching array substrates 11a, 12a.

The seal region 31 has a width which is about a half of the width of the first picture element 21a or the second picture element 21b in a direction perpendicular to the connecting boundary. Therefore, the seal region of the connecting portion is doubled by the liquid crystal panels 11, 12. Thus, a pitch between the first picture elements 21a which are adjacent to each other with the connecting boundary therebetween can be made substantially equal to a pitch in the respective switching array substrates to be connected.

It is not shown here, however a driver IC having a data driver or a scanning driver is respectively connected to the scanning line pad 25a and the data line pad 23a of the first picture element 21a used for displaying images. The seal portion 31 in the drawing has an opening, through which a liquid crystal composition may be injected into a space between the switching array substrate and the counter substrate. The opening is sealed after pouring the liquid crystal composition.

The liquid crystal panel 12 has the connecting boundary B-B' on a glass substrate 12b and is cut along the connecting boundary B-B'. Therefore, when the switching array substrates 11a, 12b are formed of the same substrate, the pixel electrodes 22 which configure the first picture element 21a on the switching array substrate 11a configure the second picture element 21b which is redundant on the switching array substrate 12a. In other words, the pixel electrodes 22 which form the second picture element 21b on the switching array substrate 11a configure the first picture elements 21a which serve to display images on the switching array substrate 12a. Therefore, a driver IC for the data line 23 is connected on an opposite side of the switching array substrate 11a and the switching array substrate 12a with the display screen intervened therebetween.

FIG. 2 and FIG. 3 show that the data line pads 23a, 23b are not uniformly spaced to illustrate simply. However, TAB (tape automated bonding) connection and COG (chip on glass) mounting of the driver IC can be facilitated by equally spacing by diagonal leads. Additionally, without mounting separated driver ICs for the data line 23 and the scanning line, a thin film transistor using as a channel a semiconductor film which comprises poly-Si (polycrystalline silicon) or μc-Si (crystallite silicon) may be formed integrally with a glass substrate so as to consist driver circuits.

As shown in FIG. 3, the switching array substrate 11a and the switching array substrate 12a are mutually connected with the connecting faces, and the RGB color filters 33 and the black matrix 32 are formed on the counter substrate side. A total width of the seal region 31 and the connecting face of the connecting portion is substantially equal to a width of the picture element consisting of the RGB pixels.

As described above, the picture element used for displaying in the liquid crystal display device is the first picture element 21a. The RGB color filters 33R, 33G, 33B are formed on the counter substrate to correspond with the openings of the pixel electrodes 22R, 22G, 22B which configure the first picture element 21a.

Meanwhile, a region corresponding to the second picture element 21b where is redundant and does not contribute for displaying is shielded by the black matrix 32. Therefore, the redundant second picture element is shielded from light by the black matrix 32 and not visible by an observer. Thus, a defect formed on the pixel electrode, the thin film transistor or the data line 23 which configures the second picture element 21 does not associate with the display quality. Accordingly, productivity of a large liquid crystal display device can be improved substantially. The black matrixes 32 have a pitch equal between the insides of the liquid crystal panels 11, 12 and the panel connection section, so that the connecting portion is not prominent. Hence, the display quality can be improved. A width $L_{BM}$ of the black matrixes is determined to fall in a range of about 90% to about 110% of a width LP of the picture element. Then, the connecting portion is not prominent. Thus, an observer seeing the display screen does not have a feeling of any peculiar touch.

To produce the liquid crystal display device according to the invention described above, the switching array substrates 11, 12 and the counter substrate may be sealed separately and then cut. Besides, the liquid crystal may be injected by one operation after performing an array inspection, cutting and connecting of the switching array substrates, forming the counter substrate into one body, and sealing.

Embodiment 2

The liquid crystal display device of the invention described in Embodiment 1 is formed by connecting two liquid crystal panels or two switching array substrates. However, the number of the switching array substrates or the liquid crystal panels is not limited to two and may be three, four or more.

Figure 5:
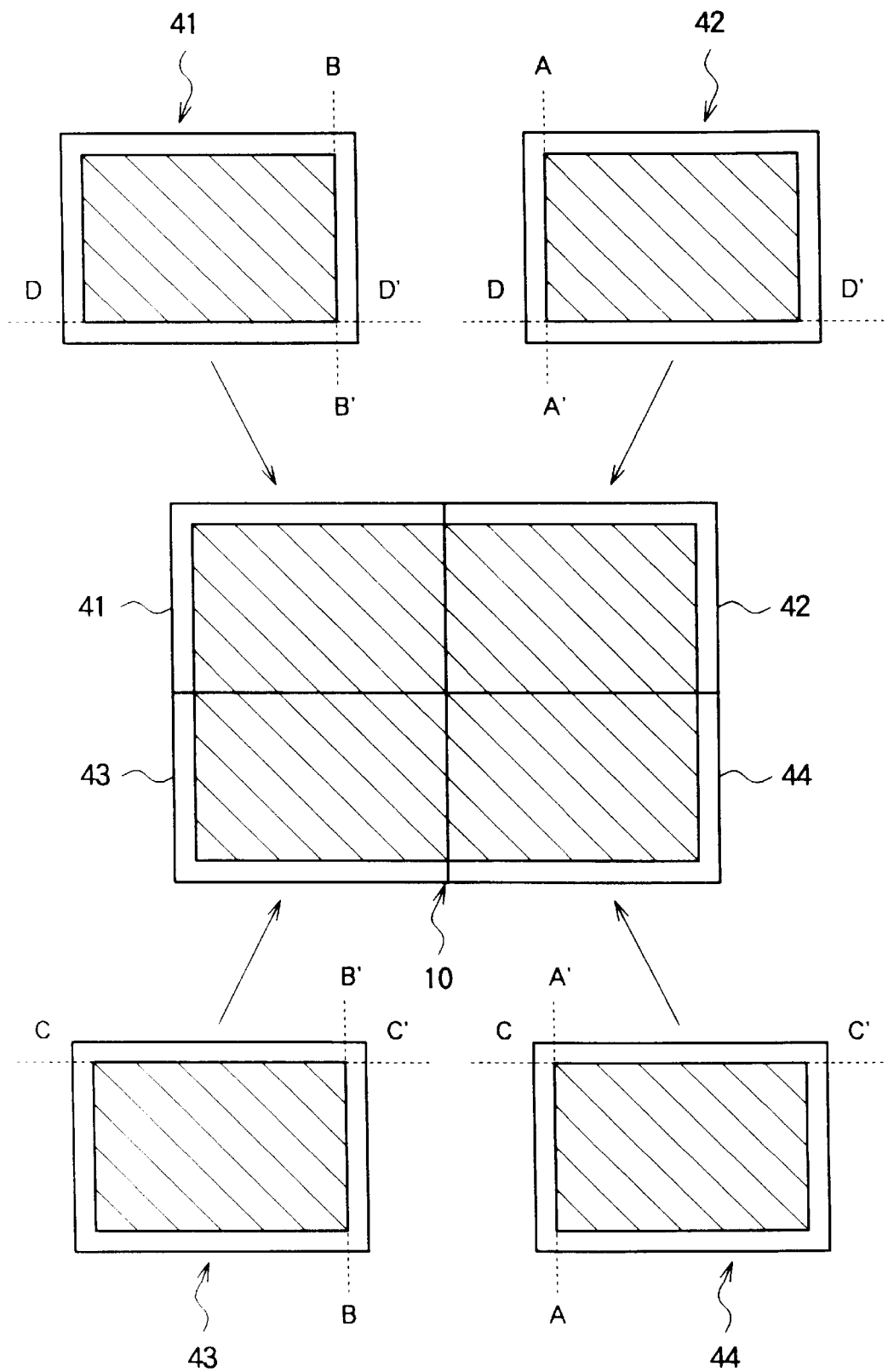
FIG. 5 is a schematic diagram showing a structure of the liquid crystal display device of the invention configured by tiling four liquid crystal panels vertically and horizontally.

FIG. 5 is a schematic diagram showing a structure of the liquid crystal display device of the invention configured by tiling four liquid crystal panels 41, 42, 43, 44 in rows and columns.

Figure 6:
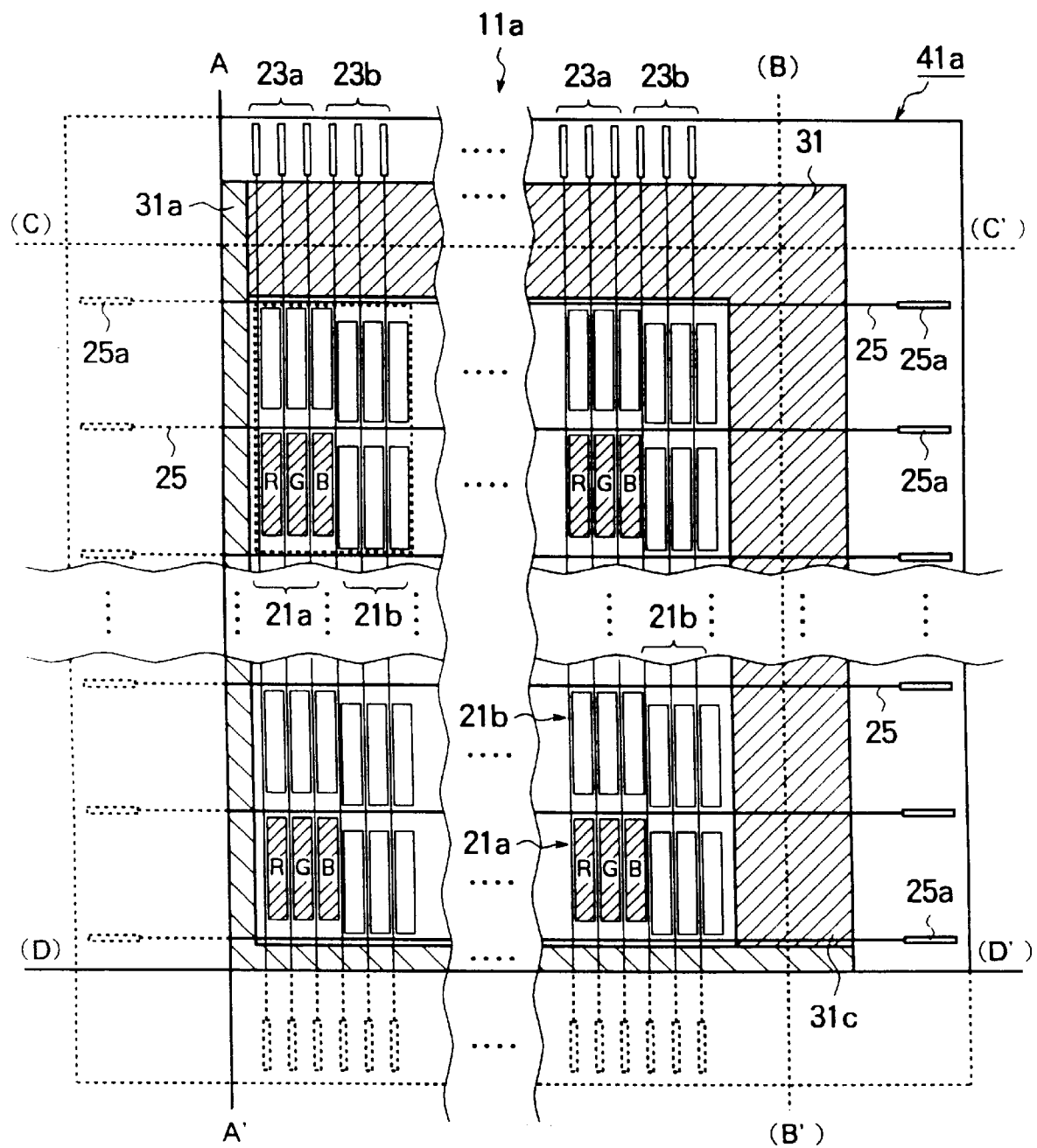
FIG. 6 is a schematic diagram showing a structure of the switching array substrates configuring the liquid crystal display device of the invention.

FIG. 6 is a schematic diagram showing a structure of switching array substrates 42a configuring the liquid crystal display device of FIG. 5.

The first picture elements 21a serving for displaying are picture elements in columns in contact with another switching array substrate with the seal region 31 therebetween. FIG. 5 shows two connecting boundaries A-A' (B-B') and D-D' (C-C'). Therefore, the picture elements, belonging to picture element columns arranged in every two columns from both sides of the connecting boundary A-A' and belonging to a picture element column arranged in every two columns from both sides of the connecting boundary D-D', are used as the first picture elements 21a for displaying images. The second picture element 21b is a redundant picture element and does not serve for displaying images.

Data lines 23 and scanning lines 25 are lead vertically and horizontally from switching array substrates 41a, 42a, 43a, 44a. The switching array substrate 41a is cut along the connecting boundaries B-B' and D-D'. The switching array substrate 42a is cut along the connecting boundaries A-A' and D-D'. The switching array substrate 43a is cut along the connecting boundaries B-B' and C-C'. The switching array substrate 44a is cut along the connecting boundaries A-A' and C-C'.

The seal region 31 facing the connecting face of the liquid crystal panel along the connecting boundary A-A' (B-B') and the connecting boundary D-D' (C-C') has a width of about a half of a width of one first picture element 21a or second picture element 21b.

Figure 7:
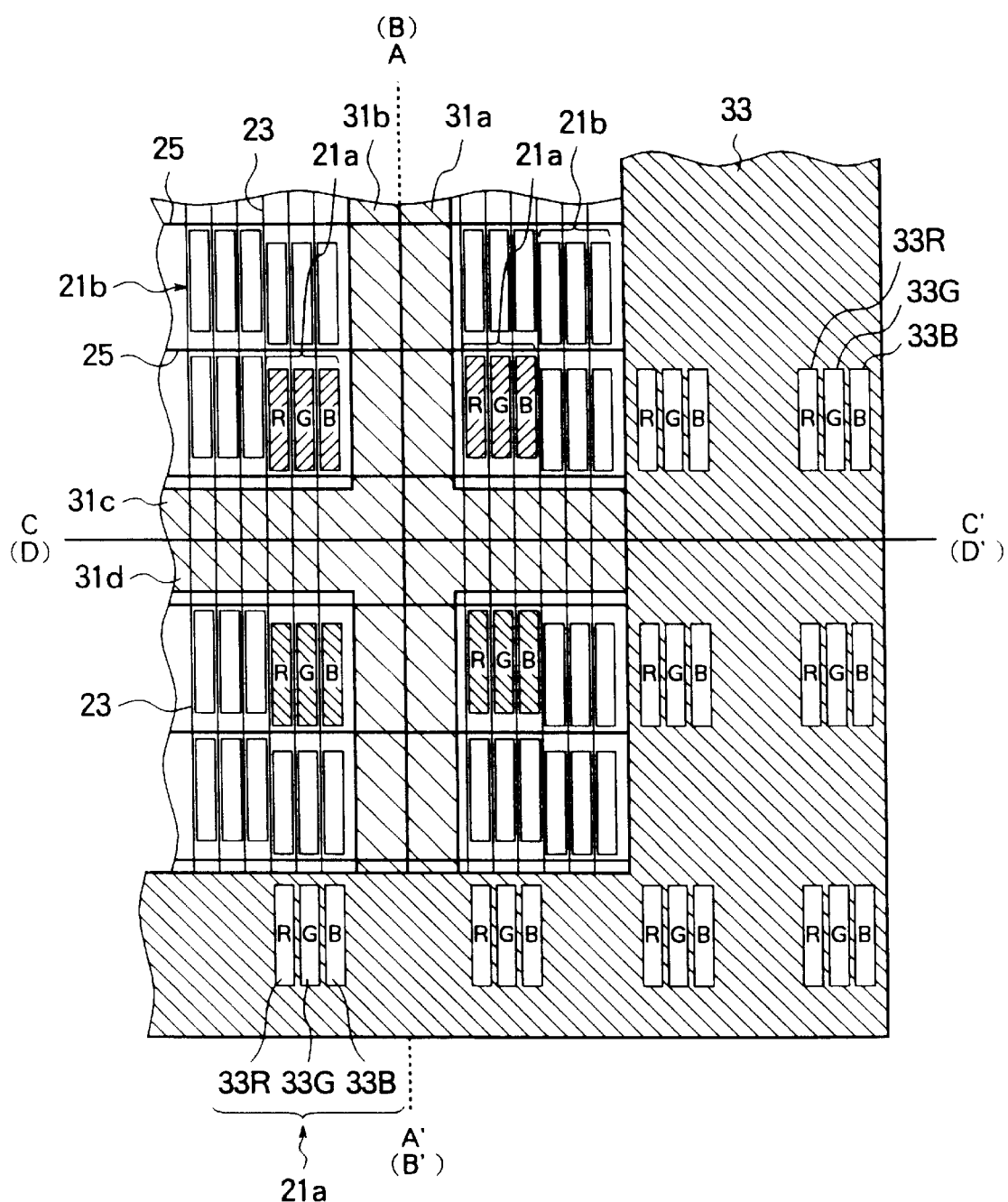
FIG. 7 is an explanatory diagram of the positional relationship of four liquid crystal panels, a black matrix and a color filter in the neighborhood of the connecting portion of the liquid crystal panels of the liquid crystal display device of the invention shown in FIG. 5.

FIG. 7 is a diagram showing a positional relationship of four liquid crystal panels, a black matrix and a color filter in the neighborhood of a connecting portion of the liquid crystal panel of the liquid crystal display device of the invention shown in FIG. 5.

A color filter 33 is formed on a region corresponding to the pixel electrodes used for displaying images and configuring the first picture element 21a. The redundant second picture element 21b and the connecting region 31 overlaid with the black matrix 32 formed on the counter substrate and are shielded, so that they are not visually recognized by an observer. A space between the respective pixel electrodes 22R, 22G, 22B configuring the first picture element 21a is also shielded by the black matrix 32.

As described above, the liquid crystal display device of the present invention, which provides a large screen by directly connecting a plurality of liquid crystal panels, can suppress flexibility of combining liquid crystal panels from being degraded due to a defective pixel or individual differences in panel characteristics. In addition, a liquid crystal display device having high resolution and a large screen, in which a connecting portion of the liquid crystal panels is hardly visible from an observer, can be provided.

Embodiment 3

Figure 8:
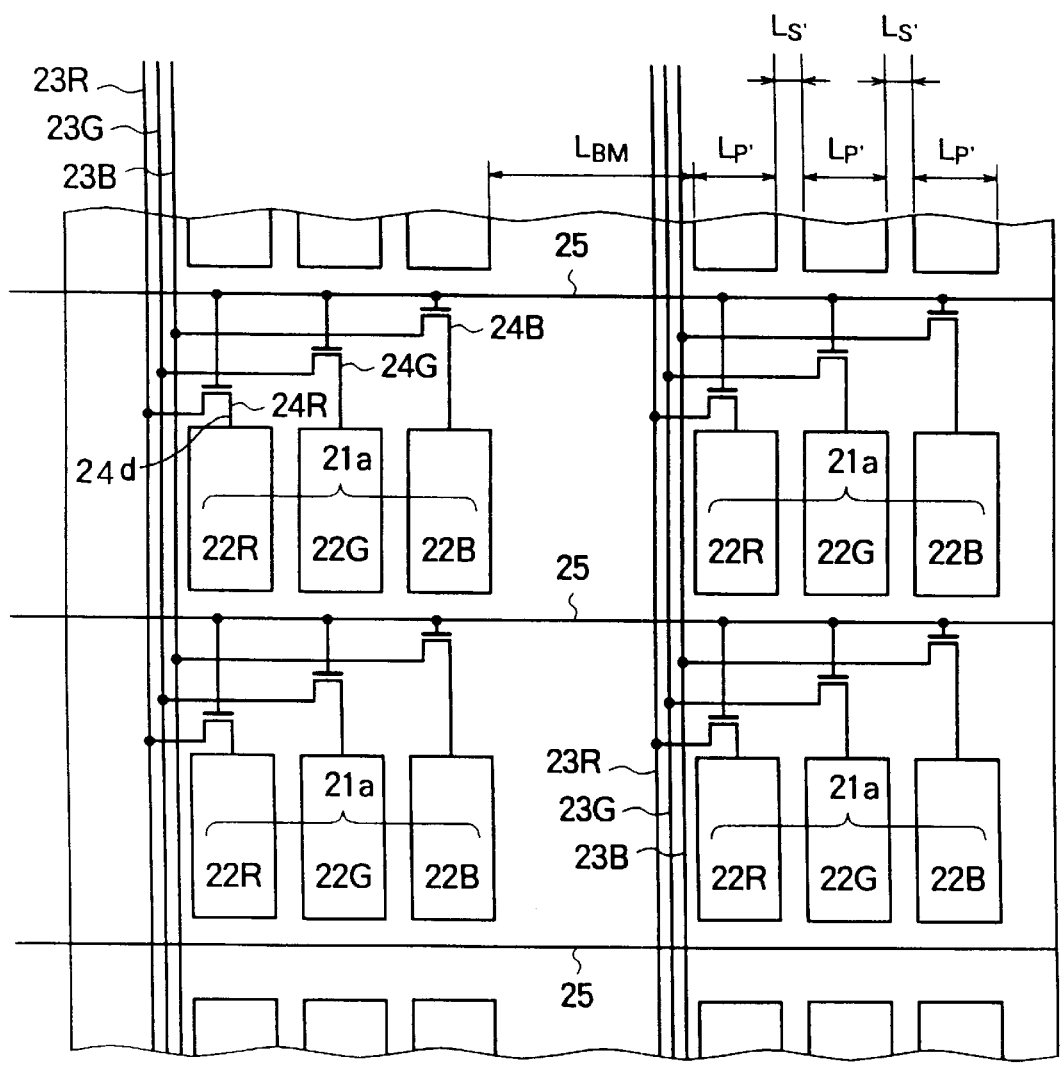
FIG. 8 is a schematic diagram showing a structure of the switching array substrates of one liquid crystal panel of the liquid crystal display device of the invention.

FIG. 8 is an enlarged schematic diagram showing a structure of the switching array substrates 11a of the liquid crystal display panel 11 connected to the right in FIG. 1. This liquid crystal display device is configured to have a single display screen by connecting two liquid crystal display panels or switching array substrates in a direction of scanning lines as shown in FIG. 1, FIG. 2 and FIG. 3.

This liquid crystal display device has data lines 23 arranged in a different way from the liquid crystal display device of the invention described above.

Figure 9:
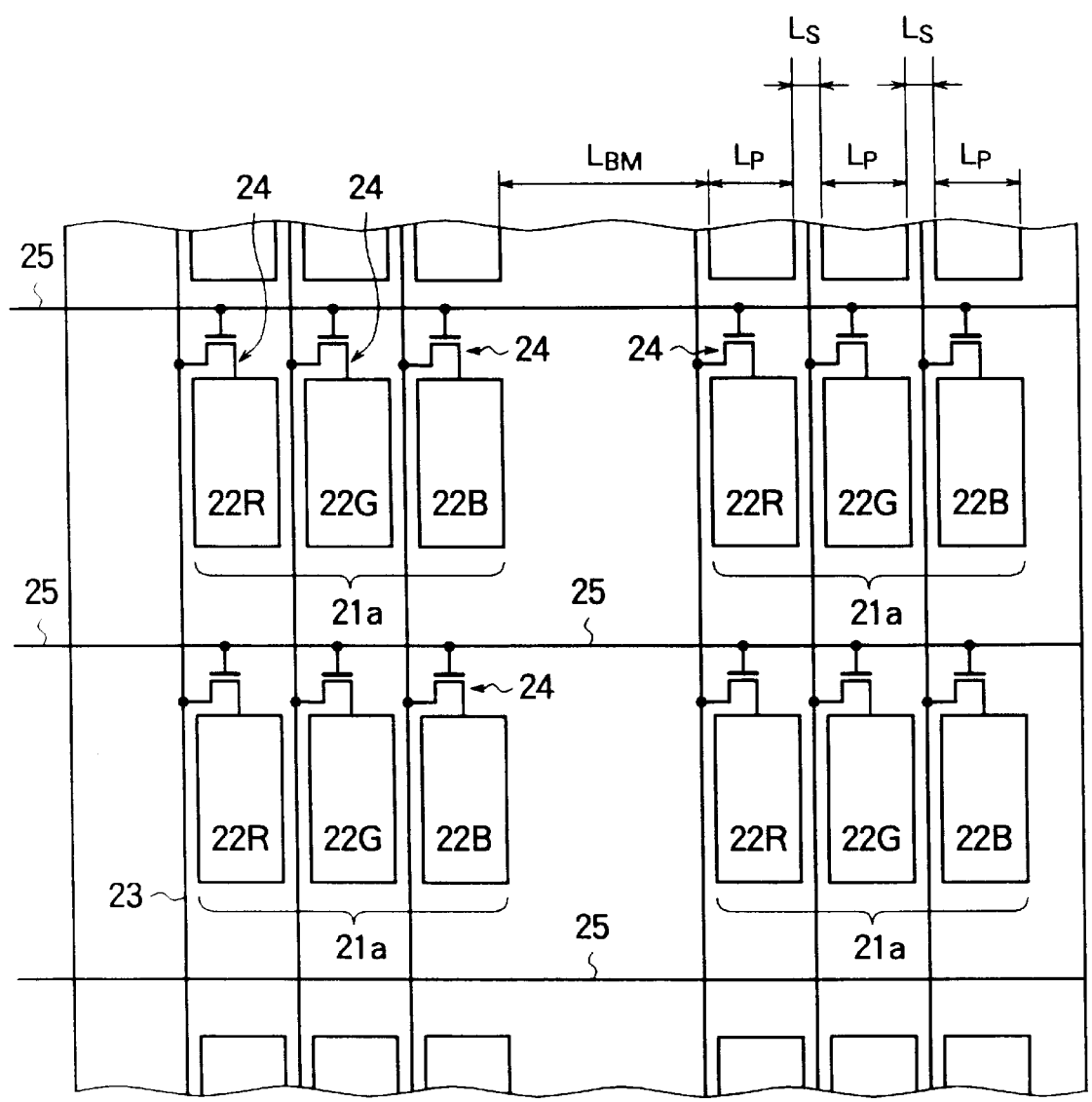
FIG. 9 is a schematic diagram showing the relationship between pixel electrodes and data lines configuring a first picture element of the liquid crystal display device of the invention.

FIG. 9 is a schematic diagram showing the relationship between the pixel electrodes 22 and the data lines 23 configuring the first picture element 21a of the liquid crystal display device of the invention described in Embodiments 1 and 2. The data line 23 is also disposed in a region between the pixel electrodes 22 adjacent to each other in one picture element.

Meanwhile, in the liquid crystal display device of the invention shown in FIG. 8, all the data lines 23 supplying data signals to pixel electrodes which configure one picture element (or a column of picture elements) are collectively arranged between the adjacent first picture elements 21a.

Reference numerals 22R, 22G, 22B denote P, G and B pixel electrodes 22, which configure one picture element 21a.

Thin film transistors 24R, 24G, 24B are connected as switching element to the pixel electrodes 22R, 22G, 22B. The three thin film transistors 24R, 24G, 24B connected to one picture element 21a are connected to the same scanning line 25.

Those three thin film transistors 24R, 24G, 24B in respective picture elements are also connected to separate data lines 23R, 23G, 23B. These data lines 23R, 23G, 23B are arranged at one side (to the left of the picture element 21 in the drawing) of the picture element. These data lines 23R, 23G, 23B are arranged in a region between adjacent picture elements 21 where shielded by the black matrix 32. The black matrix is determined to have a separation width so that a pitch of the first picture elements 21a of a single switching array substrate is substantially equal to a pitch of the first picture elements 21a which are adjacent to each other to extend over a connecting boundary.

Data lines 23G, 23B connected to other thin film transistors 24G, 24B are disposed between a drain electrode 24d and a data line 23R of the thin film transistor 24R. This part is electrically connected by a scanning line material through a through hole formed in an insulating film between the data line and the scanning line.

As described above, in the liquid crystal display device of the invention, there is no data line 23 between adjacent pixel electrodes in a single picture element 21. Therefore, width Ls' of BM in that part can be made thin to about 12 μm.

For example, it is assumed that a pitch of the picture elements 21 in a direction of the scanning line 25 is about 600 μm, width $L_{BM}$ of the black matrix separating the picture elements 21 is 330 μm, and width Ls' of the black matrix between the pixel electrodes is 12 μm. Then, the pixel electrode 22 in a direction of the scanning line 25 has a length LP' of about 82 μm. Therefore, an aperture ratio can be made larger than that of the conventional LCD. Thus, a liquid crystal display device, which is bright and has high display quality, can be provided by the invention.

The configuration in that the lines for driving the pixels are collectively disposed between the picture elements 21, 21 can also be applied when a plurality of substrates are not tiled. For example, it may be applied to a display device such as a liquid crystal display consisting of a single switching array substrate. Thus, an aperture ratio can also be improved when a single switching array substrate is used.

Embodiment 4

Figure 10:
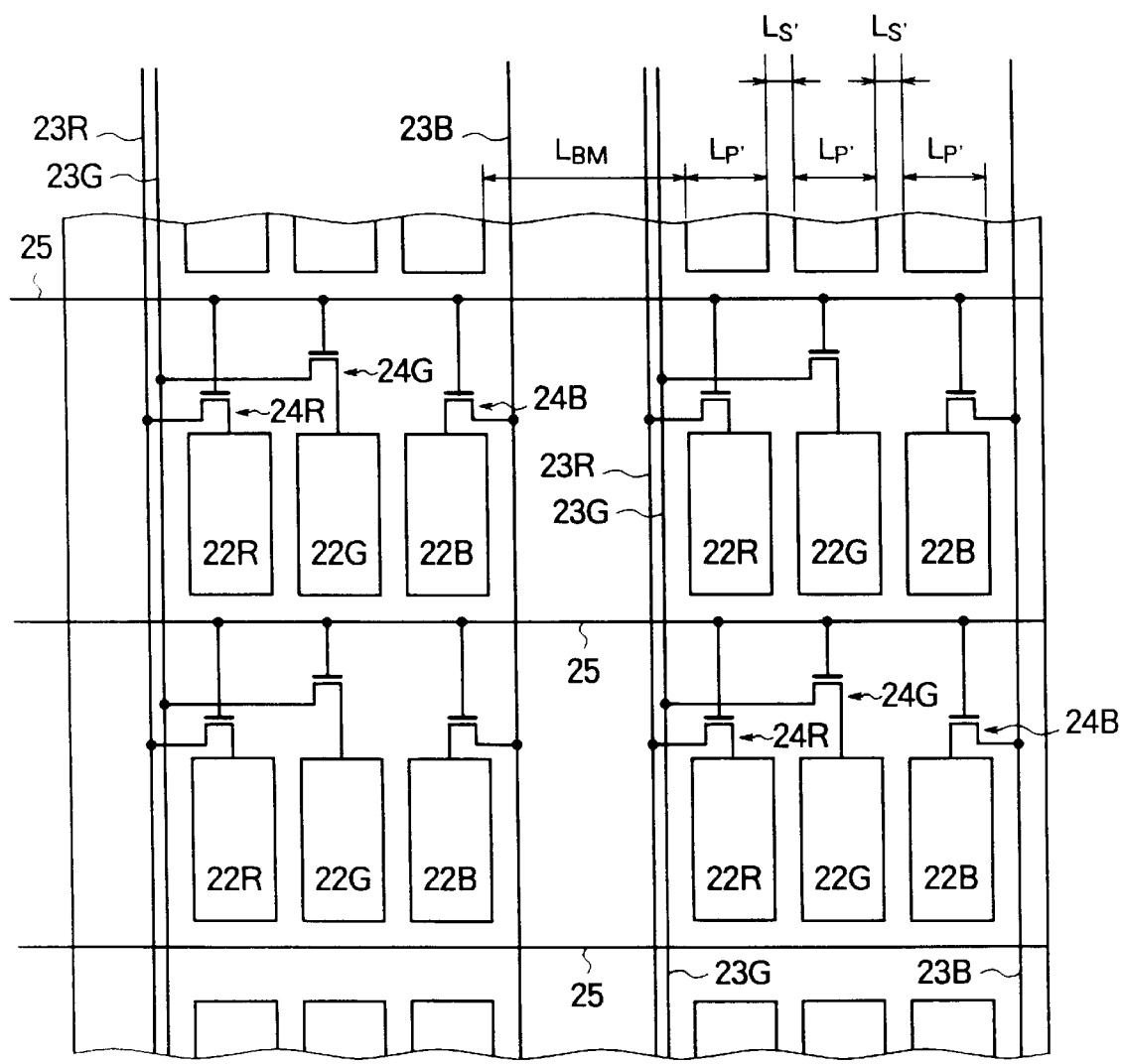
FIG. 10 is an enlarged schematic diagram showing pixel electrodes outside a connecting region in the display region.

FIG. 10 is an enlarged schematic diagram showing a structure of picture elements of the display screen region.

Reference numerals 22R, 22G, 22B denote R, G and B pixel electrodes 22, which consisting one picture element 21a.

Thin film transistors 24R, 24G, 24B are connected as switching element to the pixel electrodes 22R, 22G, 22B. The three thin film transistors 24R, 24G, 24B connected to one picture element 21a are connected to the same scanning line 25.

The three thin film transistors 24R, 24G, 24B are also connected to separate data lines 23R, 23G, 23B. All the three data lines 23B supplying data signals to the three pixel electrodes 22 belonging to one picture element are arranged on the same side of the picture element. Meanwhile, FIG. 10 shows that the data lines 23R, 23G and the data line 23B are separately arranged on both sides of one picture element. All these data lines 23 are disposed in a region shielded by the black matrix 32 which shields a connecting region and a region between the picture elements 21, 21. The black matrix is determined to have a separation width so that a pitch of the first picture elements 21a of a single switching array substrate is substantially equal to a pitch of the first picture elements 21a which are adjacent to each other to extend over a connecting boundary.

Data lines 23G, 23B connected to other thin film transistors 24G, 24B are arranged between a drain electrode 24d and a data line 23R of the thin film transistor 24R. This part is electrically connected by a scanning line material through a through hole of an interlayer insulating film between the data line 23 and the scanning line 25.

By configuring as described above, the number of crossings of wiring for connecting the data lines 23 and the pixel electrodes can be decreased as compared with the LCD shown in Embodiment 3.

Therefore, capacitance of the crossing can be decreased, and productivity can also be improved.

Figure 20:
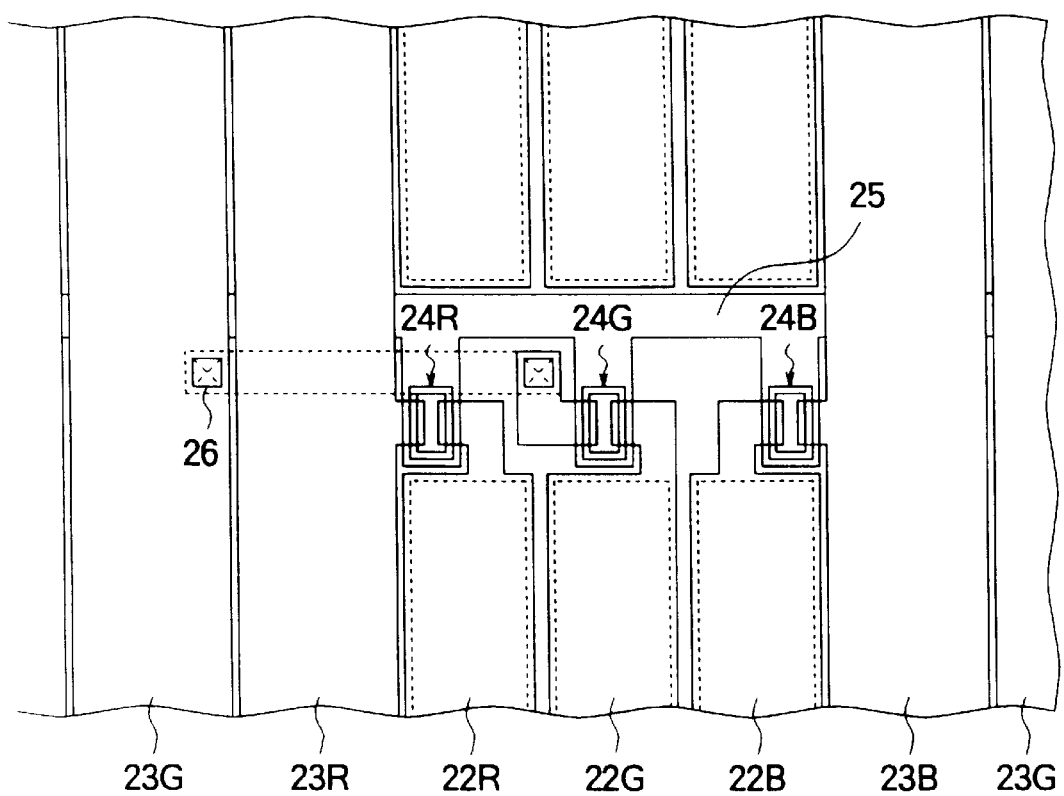
FIG. 20 is a schematic diagram showing a structure of the picture element of the invention.

FIG. 20 is a diagram showing more precisely the structure of the picture element shown in FIG. 10. One picture element comprises pixel electrodes 22R, 22G, 22B. Data signals are supplied to these pixel electrodes through data lines 23R, 23G, 23B by an data driver (not shown). Data signals applied to the data lines are selectively applied to the pixel electrodes by the thin film transistors 24R, 24G, 24B which are turned on or off through the scanning line 25.

In this case, in order to avoid three-dimensional wiring, the pixel electrodes in the picture element are arranged in RGB, while the data lines between the picture elements are arranged in BGR. In other words, the pixel electrode 22R and the data line 23R are adjacent to each other. Also, the pixel electrode 22B and the data line 23B are adjacent to each other. Accordingly, three-dimensional wiring using a contact hole 26 is adopted only for connection of the pixel electrode 22G at the middle of in the picture element with the data line 23G. By configuring in this way, interlayer connection of wiring patterns can be decreased as small as possible. Thus, productivity and reliability of the liquid crystal display device can be improved. Besides, the number of wire crossings can be decreased, and capacitance parasitic on the crossing part can be decreased. Therefore, display quality can be improved.

As described above, the liquid crystal display device of the invention has a plurality of switching array substrates or liquid crystal display panels directly connected in parallel to obtain a large screen, and the data lines 23 which disturb penetration of light collectively arranged below the black matrix which is inevitable to make the connected part invisible. Thus, an aperture ratio can be prevented from having a lowered transmissivity, and display quality can be improved.

Embodiment 5

In the embodiment described above, the liquid crystal display device, in which a width and an arrangement pitch of picture elements used for displaying become approximately equal, has redundant picture elements arranged in a region between picture elements. Besides, a plurality of data lines supplying data signals to a plurality of pixel electrodes in the picture element is arranged. Additionally, the liquid crystal display device of the present invention may have a logic circuit, which supplies data signals through a switching element arranged on every pixel electrode, in a region between the picture elements.

The logic circuit has at least one switching element such as TFT or TFD. In this embodiments, the logic circuit does not include a switching element such as so-called pixel selecting thin film transistor or MIM. In other words, the logic circuit does not include the switching element which source and drain directly connected with the pixel electrodes. The logic circuit is a circuit capable of supplying data signals to the pixel electrodes through the pixel selecting switching element.

The logic circuit is, for example, a shift register, a data latch, a memory such as RAM or EEPROM, a digital comparator, a flip-flop or a D/A converter having such circuits combined.

The logic circuit may be formed for each picture element or for each column of picture elements. Picture elements configuring the display region may be divided into a plurality of blocks, and the logic circuit may be also formed for each of the divided blocks of picture elements.

In any case, it is preferable to form the logic circuit in a range that an arrangement pitch of picture elements in the display region becomes approximately equal. Thus, performance of the liquid crystal display device can be improved without effecting on display quality.

For example, it is assumed that a liquid crystal display device having a large display screen is configured by combining a plurality of switching array substrates or liquid crystal display panels as described above. In this case, it is necessary that an arrangement pitch of picture elements adjacent to each other to extend over the connecting region of a plurality of switching array substrates and picture elements adjacent to each other in the switching array substrates is substantially equal along a predetermined direction (for example, a direction of data lines or a direction of scanning lines) Then, an arrangement pitch of a picture element and a picture element in the switching array substrates depends on an arrangement pitch of the picture elements adjacent to each other to extend over the connecting region of the switching array substrates. Therefore, the arrangement pitch of picture elements in the switching array substrates is relatively large, which is substantially equal to, for example, a width in a direction of data lines or scanning lines of a unit picture element. Accordingly, a logic circuit for supplying data signals to the pixel electrode as described above can be formed in such a region. The region between the picture elements and having the logic circuit is preferably shielded by a black matrix or the like.

The liquid crystal display device of the present invention, which has a logic circuit for processing data signals formed in the region between the picture elements, is not limited to a liquid crystal display device which is formed by tiling a plurality of switching array substrates or liquid crystal panels described above. For example, it may be applied to a liquid crystal display device configured by having a liquid crystal layer interposed between one switching array substrate and a counter substrate.

Figure 11A:
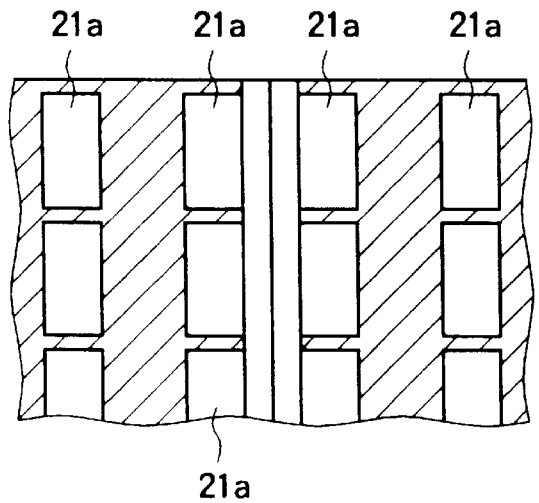
FIG. 11A and FIG. 11B are schematic diagrams showing the relationship between a plurality of switching array substrates configuring the liquid crystal display device of the invention and picture elements arranged on the switching array substrates.
Figure 11B:
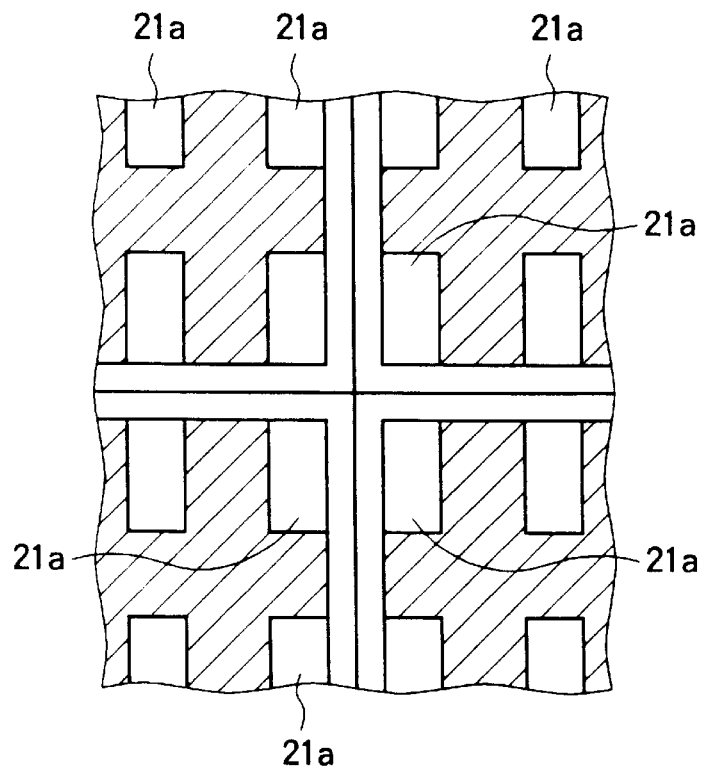

FIG. 11A and FIG. 11B are schematic diagrams showing the relationship of a plurality of switching array substrates and picture elements arranged on the switching array substrates which configure the liquid crystal display device of the invention.

As described above, a tiling width is preferably equal to or has a difference of 10% or below of a width of one picture element. The tiling margin is consisting of a non-display region required when a plurality of switching array substrates or liquid crystal panels. The tiling margin is a summary of a seal width required for sealing the liquid crystal, and a connection width for connecting the panel substrates. The pitch of picture elements arranged in the individual switching array substrate is made equal to the tiling width, so that the joint part can be made invisible.

Thus, where two switching array substrates or liquid crystal panels are tiled as shown in FIG. 11A, a non-display part where does not serve for displaying images is formed between the tiled region 31 and the picture elements 21a arranged in rows. Where four switching array substrate or liquid crystal panels are tiled as shown in FIG. 11B, a non-display region where does not serve for displaying images is formed between the picture elements 21a arranged in rows and columns is produced. In the liquid crystal display device of the present invention, the non-display region (the hatched part in FIG. 11A, FIG. 11B) between the picture elements which serve for displaying images on the respective switching array substrates may have a logic circuit for supplying data signals to the pixel electrodes through the switching elements.

Embodiment 6

Figure 12A:
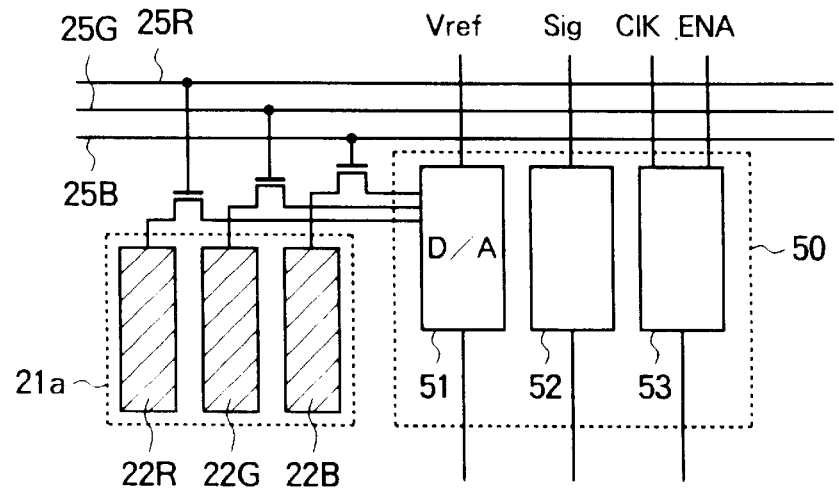
FIG. 12A and FIG. 12B are schematic diagrams showing a structure of the liquid crystal display device of the present invention.
Figure 12B:
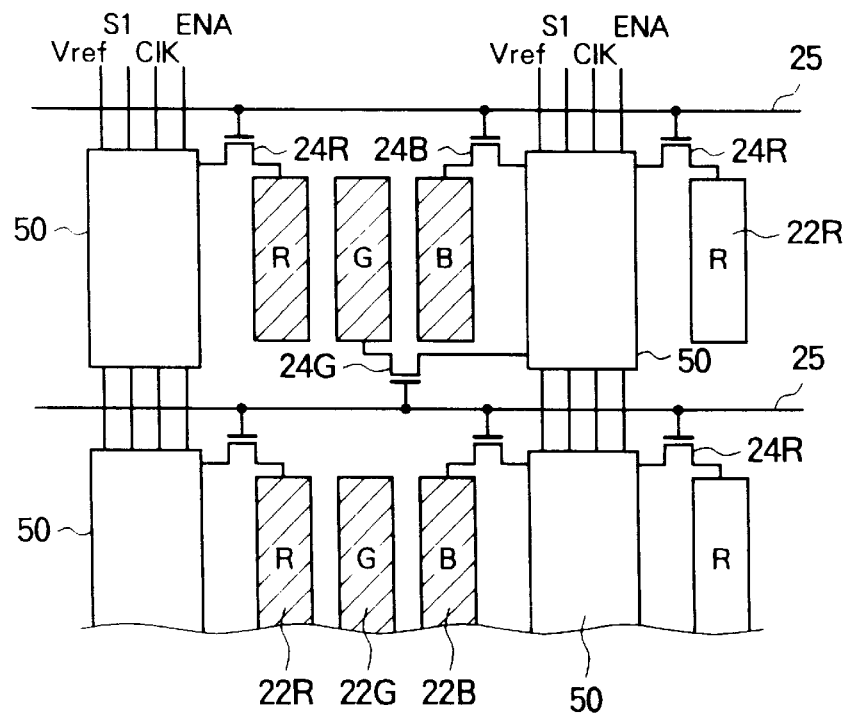

FIG. 12A and FIG. 12B are schematic diagrams showing structures of the liquid crystal display devices of the invention.

In this liquid crystal display device, a data signal processing circuit 50, which supplies data signals to the pixel electrodes 22 through source and drain of the thin film transistors 24 is formed on a region between the picture elements 21a, 21a in a single switching array substrate. Here, the configuration in that one data signal processing circuit 50 is formed on each picture element 21a is described below.

The picture element 21a as a component element of the display screen has the data signal processing circuit 50 having a logic circuit on the region between the adjacent picture element 21a.

A digital data signal supplied from an unillustrated external circuit is processed by the data signal processing circuit 50. Specifically, an analog voltage level corresponding to the digital data signal is applied to the pixel electrodes 22 (22R, 22G, 22B), which configure the picture element 21a, through the source and drain of the thin film transistors 24 (24R, 24G, 24B). In other words, the analog data signal voltage produced in the data signal processing circuit 50 is selectively written into the pixel electrodes 22 by on/off control of the thin film transistors 24.

The data signal processing circuit 50 can make any processing and may adopt a configuration as required. This data signal processing circuit 50 comprises a D/A converter 51 which is D/A converting means for converting the digital data signal into the analog signal to be electro to the pixel electrode 22, a data latch 52 which is memory means for holding the digital data signal, and a shift register 53 which is gate means for controlling the entry of the data signal into the memory means. Memory means can also be a digital memory. A reference signal voltage Vref. is entered into the D/A converter, data signal S1 is entered into the data latch, and a clock (hereinafter called as CLK) and an enable signal (hereinafter called as ENA) for controlling writing are entered into the shift register.

Therefore, the data signal S1 is held by the data latch into which writing is allowed by CLK and ENA. An analog data signal voltage Vs1 corresponding to the data signal S1 is then produced by the D/A converter. Writing of the data signal voltage Vs1 into the pixel electrode 22 is controlled by the switching element provided on every pixel electrode 22.

The thin film transistor 24 is turned on by the scanning signal, which is applied from the scanning line 25 to the gate electrode 24g of the thin film transistor 24. At this time, the analog voltage level corresponding to the data signal produced in the data signal processing circuit 50 is applied and written into the pixel electrode 22 through the source and drain of the thin film transistor 24.

FIG. 12A shows that the data signal voltage Vs1 corresponding to the data signal is applied from one data signal processing circuit 50 to all the pixel electrodes 22 configuring one picture element 21a, and the gate electrodes 24g of all the thin film transistors 24 connected to the pixel electrodes 22 configuring one picture element 21a are connected to the same scanning line 25.

Meanwhile, FIG. 12B shows that the data signal voltage Vs1 corresponding to the data signal is applied to the pixel electrodes 22 configuring one picture element 21a from two data signal processing circuits 50 arranged on both sides of the picture element 21a. Besides, the gate electrode 24g of the thin film transistor 24 connected to the pixel electrodes 22 configuring one picture element 21a is connected to a plurality of scanning lines 25 arranged on both sides of the picture element 21a.

For example, the number of overlaps of wiring can be decreased by changing a connecting method of the data signal processing circuit 50 and the pixel electrode 22 as shown in FIG. 12B (see Embodiment 4).

Embodiment 7

Figure 13:
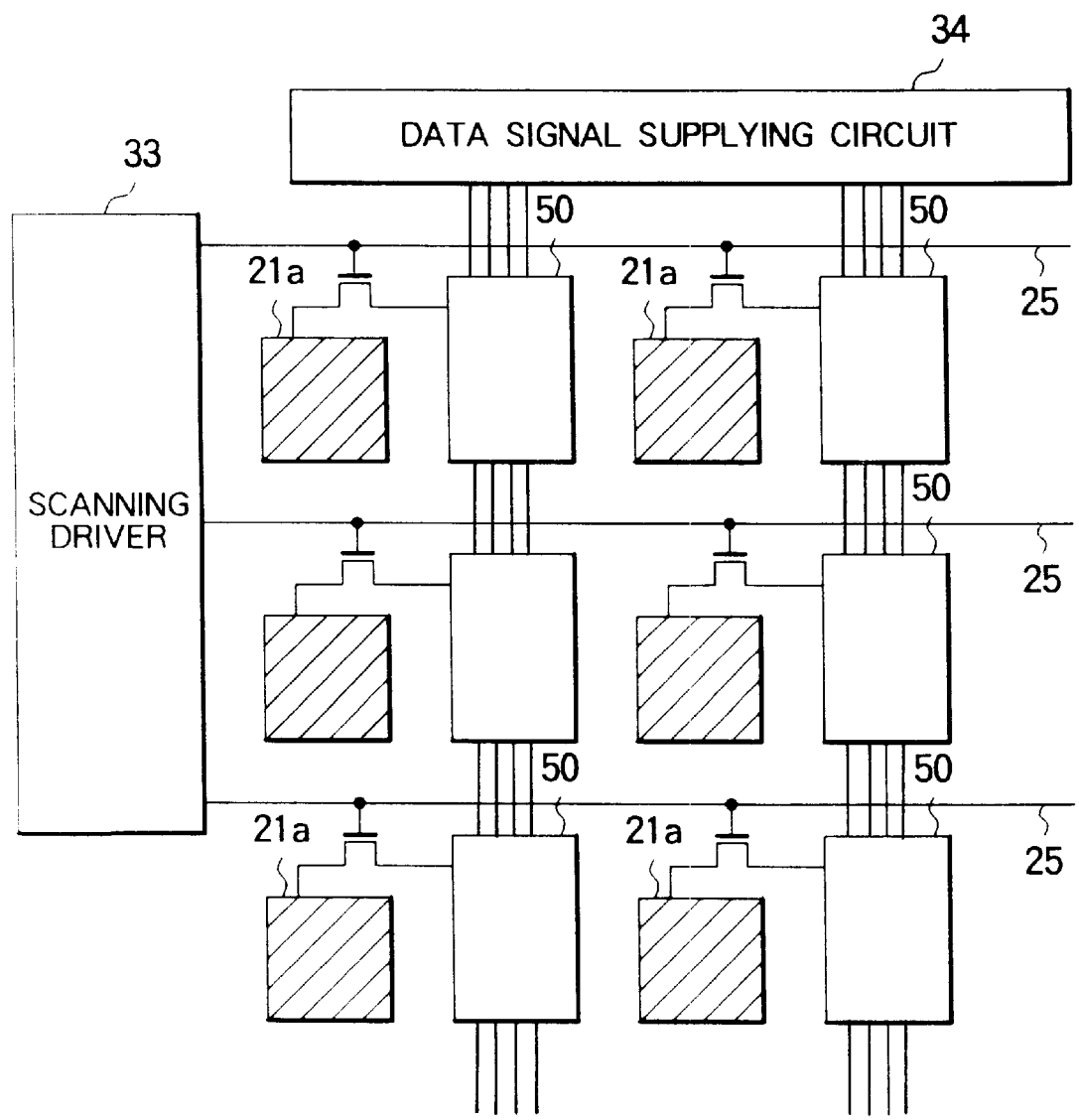
FIG. 13 is a schematic diagram showing another structure of the liquid crystal display device of the invention.

FIG. 13 is a schematic diagram showing another configuration of the liquid crystal display device of the invention.

This liquid crystal display device has the data signal-processing circuit 50 formed for every first picture element 21a arranged in columns. FIG. 13 collectively shows the picture elements 21a consisting of a plurality of pixel electrodes 22 and a plurality of data lines 23 and scanning lines 25 corresponding to the picture elements 21a for simple illustration. A reference signal voltage, a data signal, CLK, ENA are supplied from a data signal supplying circuit 34 to the pixels 22 configuring the first picture element 21a arranged in columns parallel to, for example, the data line 23.

Figure 14:
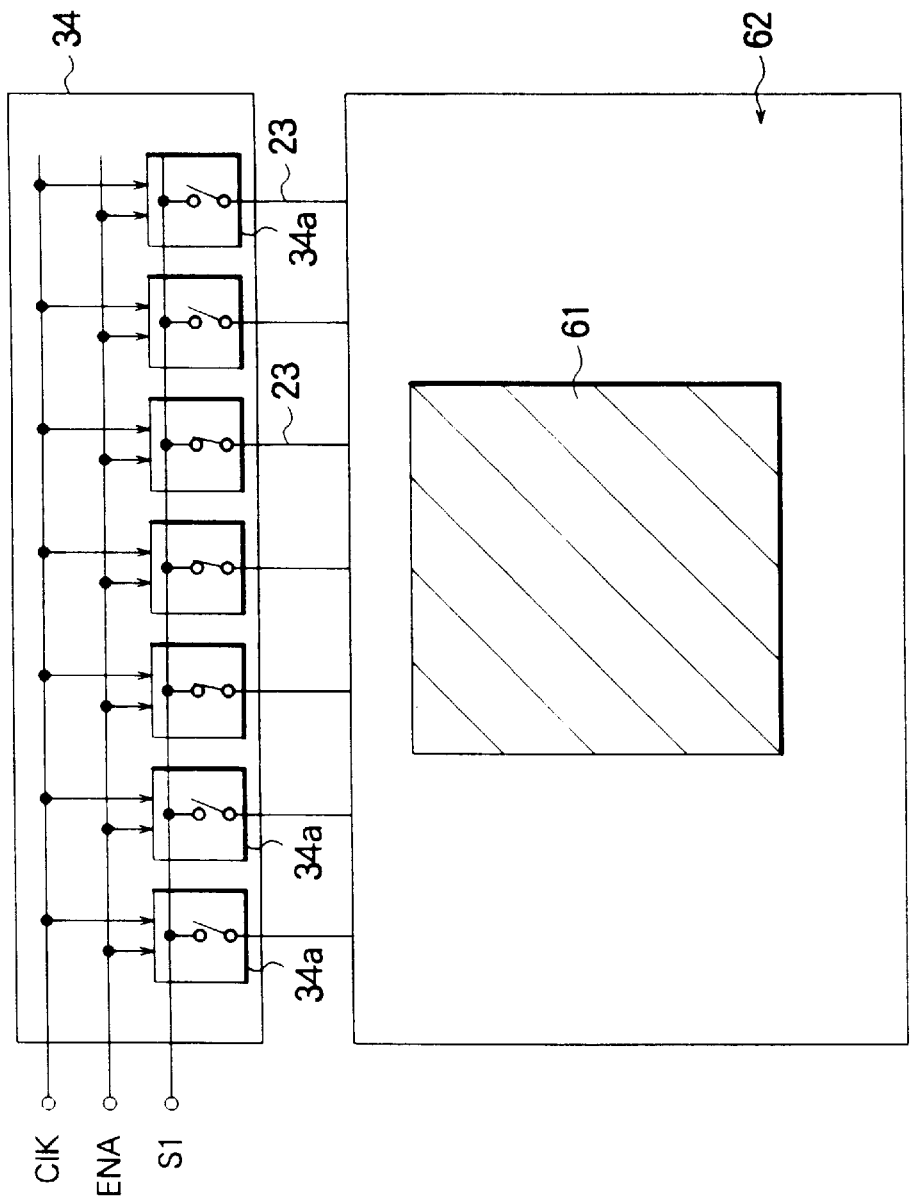
FIG. 14 is a schematic diagram showing the display screen having a window in that only the display image in a partial region can be rewritten.

In a group of pixels in a direction of rows that the data signal voltage is applied to the pixel electrode 22, the scanning signal voltage to turn ON the thin film transistor 24 is continuously output from the scanning driver 33 to the scanning line 25. FIG. 14 is a schematic diagram showing the display screen having a window, that only the display image in a partial region can be rewritten.

Where a display screen 60 has a region 61 where a displayed content is rewritten and a region 62 where a displayed content is not changed thereon as shown in FIG. 14, the data signal can be supplied to the rewritable region 61 only. Accordingly, when windows are shown on the display screen and the displayed content of a certain window is updated, the power consumption can be decreased.

Here, the data signal supplying circuit 34 can perform whatever processing. For example, a data signal is entered into any data lines 23 selected among processing circuits 34a consisting of a shift register and a data latch, and a data signal of a rewriting image is transmitted to the data signal processing circuit 50 in the display region.

By configuring as described above, data can be transmitted to only the picture elements to be rewritten. Thus, power consumption can be decreased, and rewriting frequency can also be changed.

Embodiment 8

Figure 15:
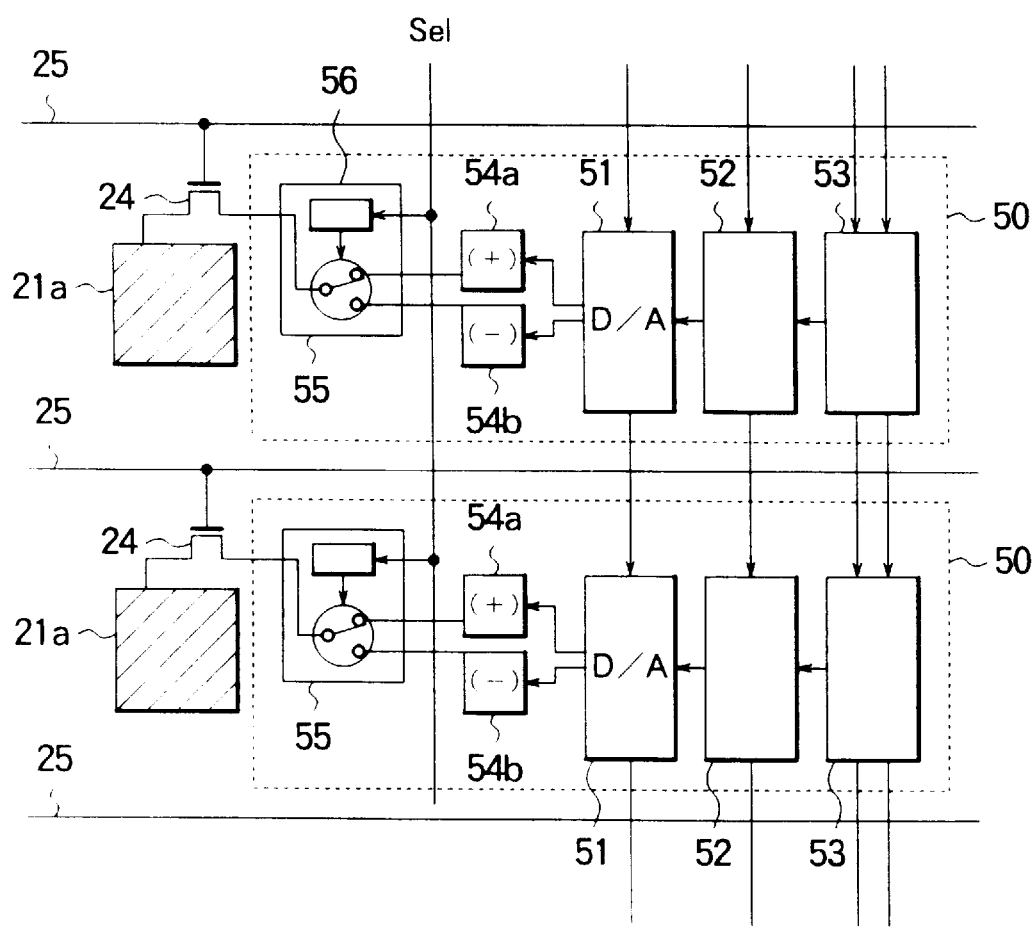
FIG. 15 is a schematic diagram showing still another structure of the liquid crystal display device of the invention.

FIG. 15 is a schematic diagram showing another configuration of the liquid crystal display device of the invention.

As shown in FIG. 15, this liquid crystal display device has in the data signal processing circuit 50 a buffer circuit 54 having a positive data signal voltage (+Vs1) and a negative data signal voltage (−Vs1) corresponding to the data signal. It is also configured to allow polarity inversion of the picture elements 21a not rewriting the data signal held in memory means such as the data latch 52.

A selector part 55 for controlling the polarity of the data signal voltage Vs1 to be applied to the pixel electrode 22 is configured to receive a select signal Sel from unillustrated circuits which supplies the select signal Sel to record into the buffer part 54 and to make selection between a buffer part 54a with positive polarity and a buffer part 54b with negative polarity.

Even when the data signal is rewritten, new data signal voltage Vs1 can be held in the buffer part 54 of non-selected polarity. Therefore, writing of the data signal voltage Vs1 into the pixel electrode 22 and transmission of the data signal to the data signal-processing circuit 50 can be made simultaneously.

Embodiment 9

Figure 16:
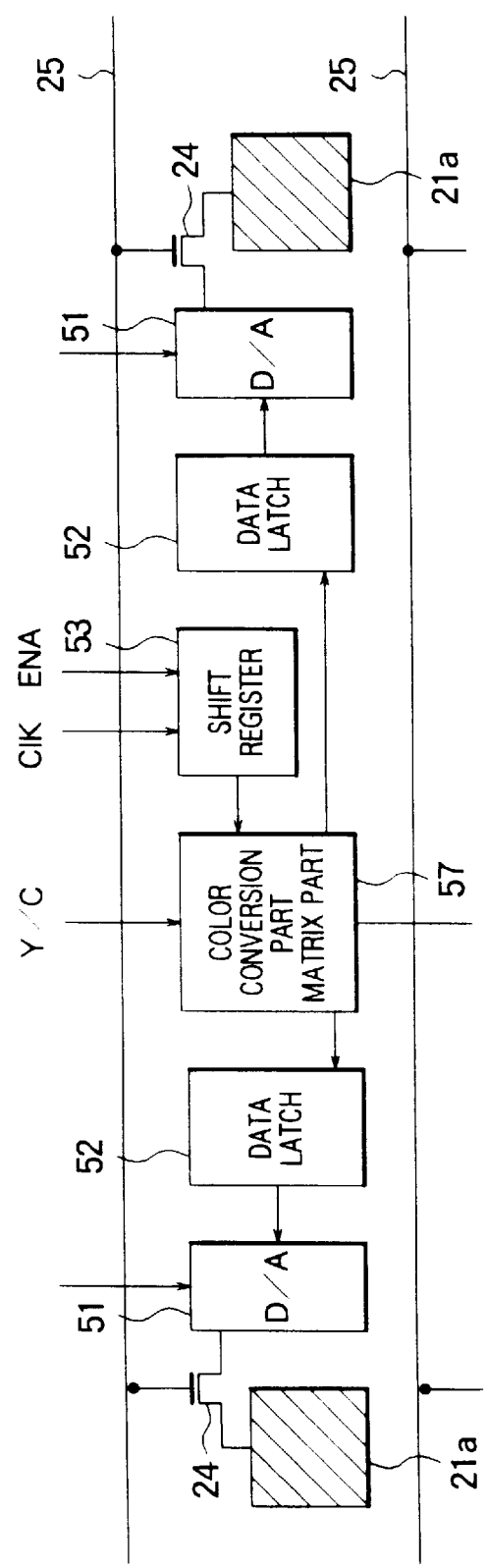
FIG. 16 is a schematic diagram showing additional structure of the liquid crystal display device of the invention.
Figure 17:
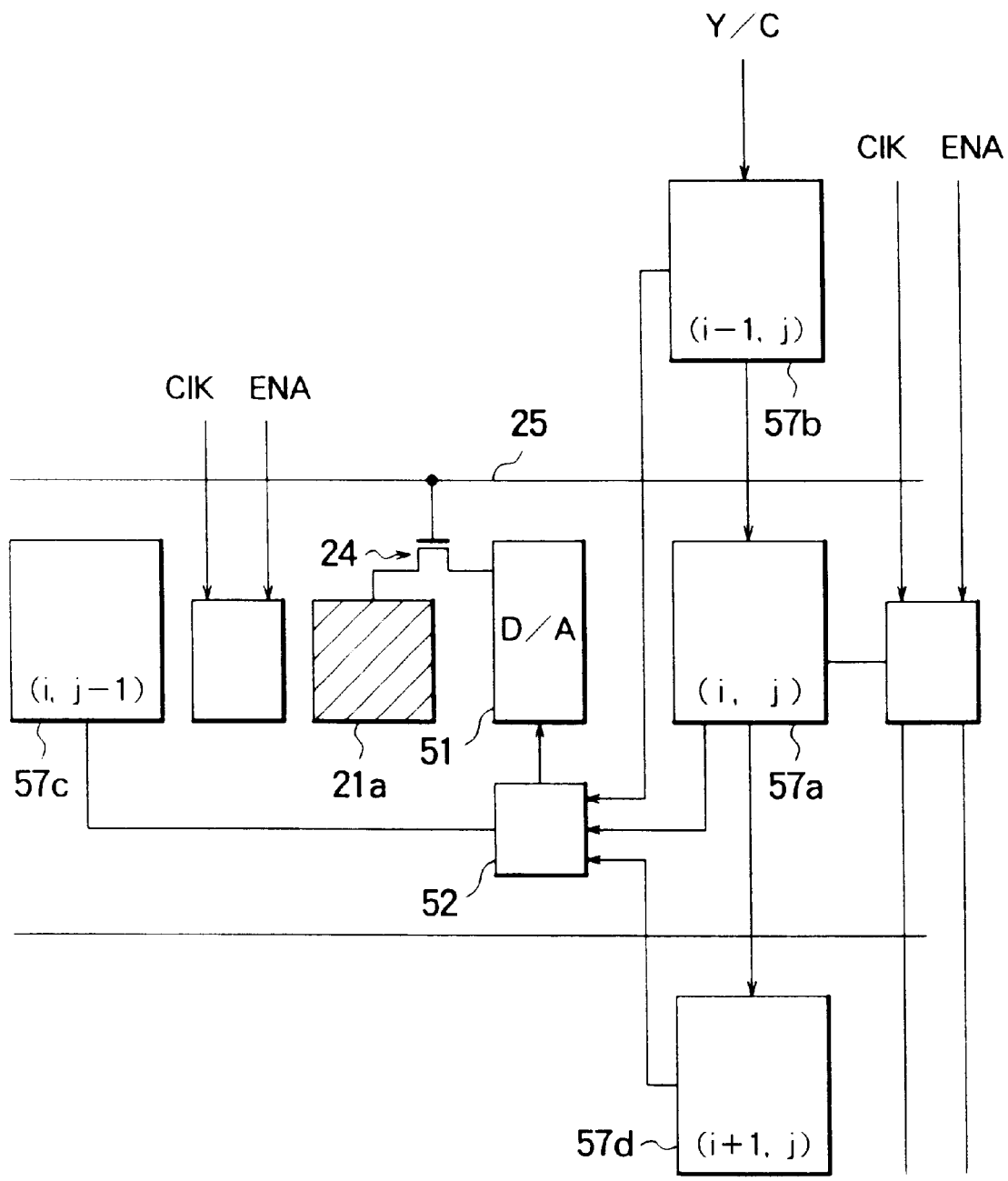
FIG. 17 is a schematic diagram showing a further structure of the liquid crystal display device of the invention.

FIG. 16 and FIG. 17 are schematic diagrams showing another configuration of the liquid crystal display device of the invention.

In the liquid crystal display device shown in FIG. 16, Y/C signal as image data is entered into a color conversion matrix 57, which is provided for every picture element 21a adjacent through the data line 23. The contents processed by the color conversion matrix 57 may be anything and can also be distributed equally to the neighboring picture elements.

The liquid crystal display device shown in FIG. 17 can also produce a plurality of Y/C image data per picture element 22a, for example, RGB data signals, from a color conversion matrix (i−1, j) 57b, a color conversion matrix (i, j) 57a, a color conversion matrix (i, j−1) 57c, and a color conversion matrix (i+1, j) 57d.

In this case, those data larger than the maximum gradation may be generated depending on distributor used in. However, displaying images can be made uniformly by redistributing an excess portion to the next picture element.

Embodiment 10

Figure 18:
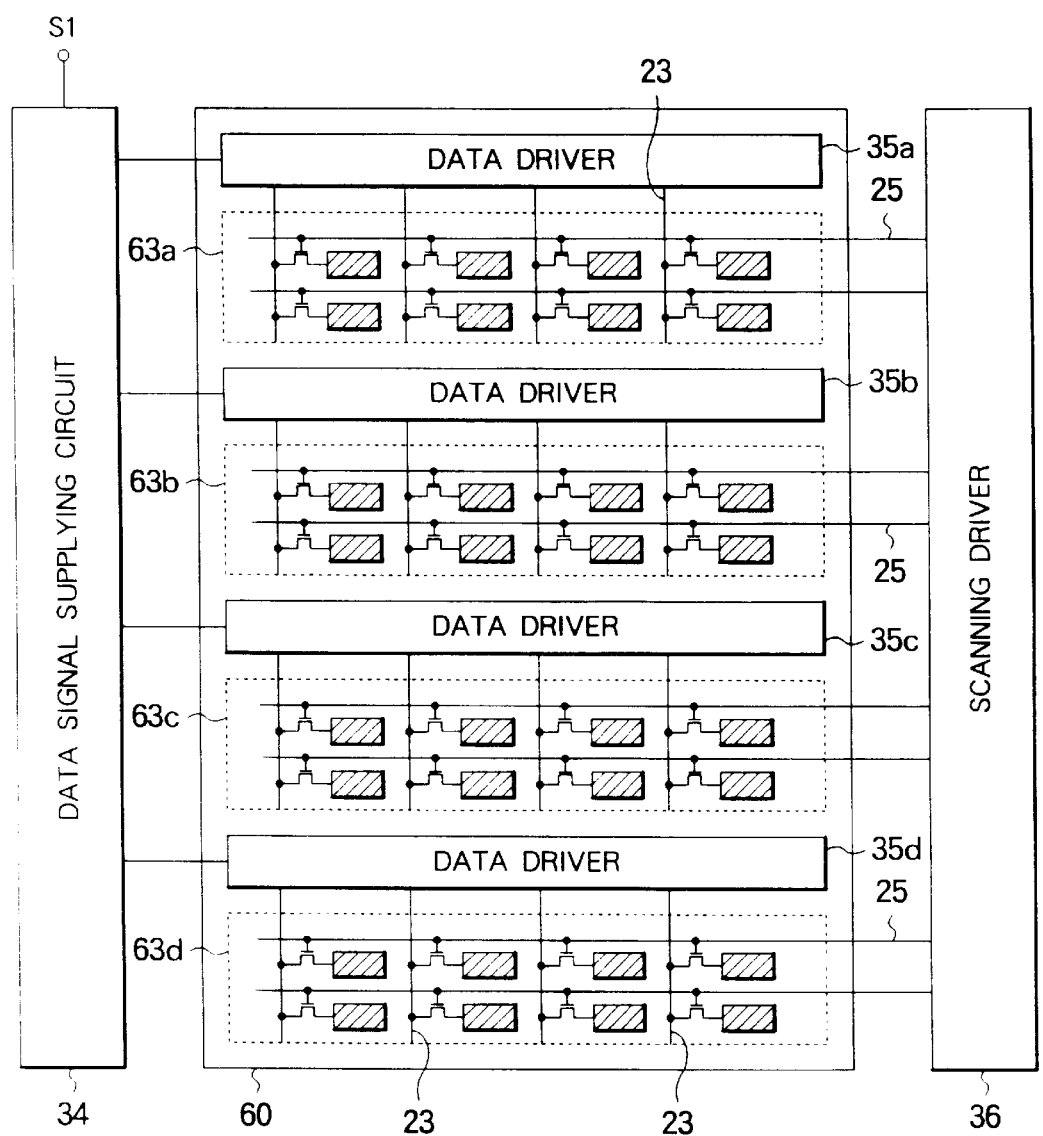
FIG. 18 is a schematic diagram showing another structure of the liquid crystal display device of the invention.
Figure 19:
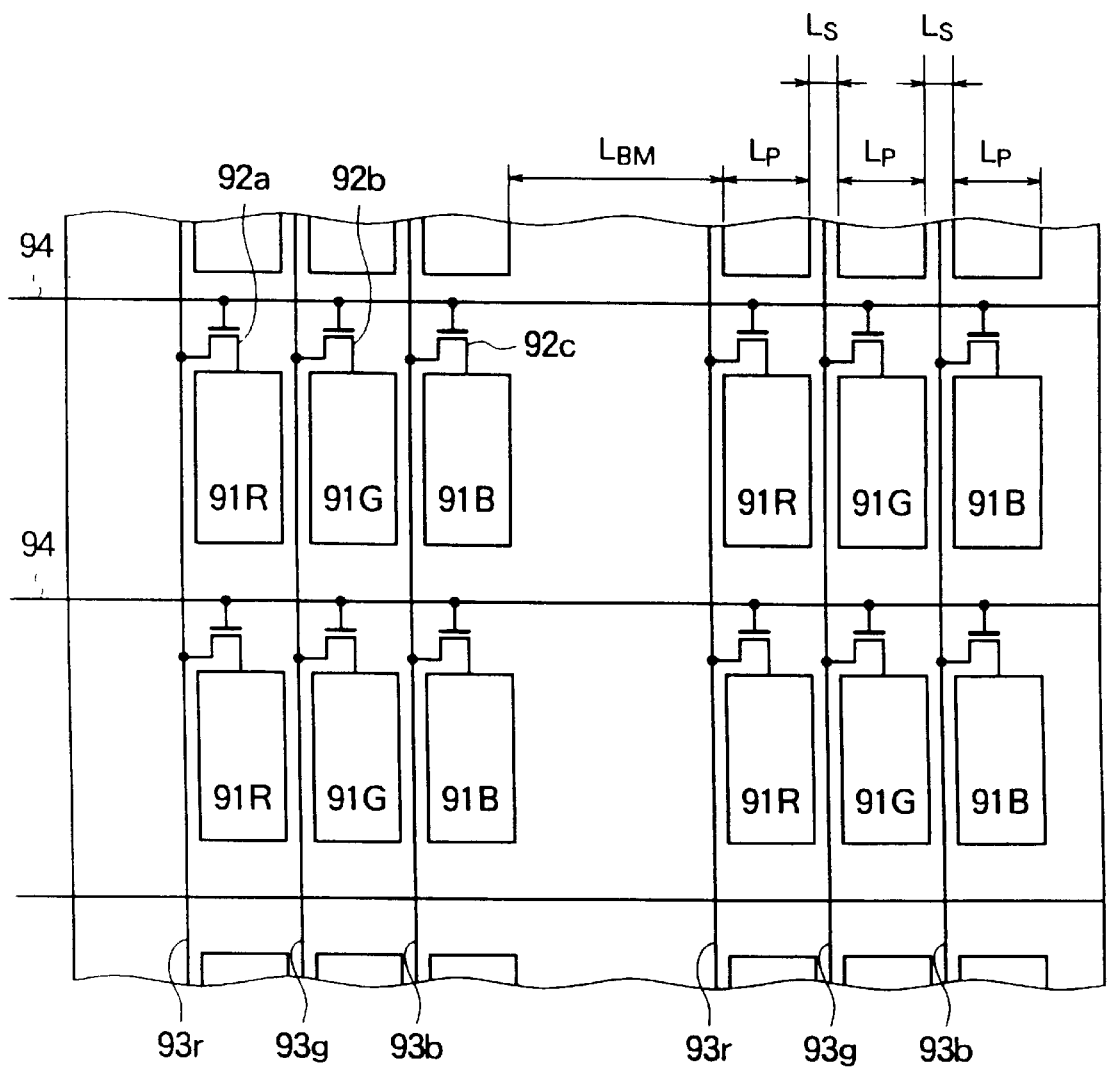
FIG. 19 is a schematic diagram showing a structure of a conventional liquid crystal display device.

FIG. 18 is a schematic diagram showing another configuration of the liquid crystal display device of the invention. This liquid crystal display device has the pixels 22 or the picture elements 21, which configure the display region 60, divided into a plurality of blocks (sub-matrix) and the logic circuits or data drivers arranged for the divided respective blocks of picture elements.

In this liquid crystal display device, the pixels or picture elements arranged in columns are divided into at least two or more blocks, and the data driver is provided for each block. For example, all the pixel electrodes 22, which configure the display region 60, are divided into four blocks 63a, 63b, 63c, 63d, and data drivers 35a, 35b, 35c, 35d are arranged for the respective blocks. The picture elements 21a configuring the blocks 63a, 63b, 63c, 63d are separately driven by the data drivers 35a, 35b, 35c, 35d. A scanning driver 36 is designed to drive all the picture elements 21a. The data drivers 35 are arranged in a range so that an arrangement pitch of the picture elements 21a in the display region 60 becomes approximately equal. Therefore, a width required for arranging the data drivers 35 does not affect on the display quality.

By configuring as described above, writing time of data signals into the pixel electrodes 22 can be made long by about four times even when the display screen 60 is made larger. Accordingly, a liquid crystal display device with a large capacity can have an enhanced contrast, and the display quality can be improved substantially.

When data signals are written, the scanning signal for turning on the thin film transistor 24 is applied from the scanning driver 36 to the gate electrode 24g of the thin film transistor 24 through scanning lines 25. To supply data signals to the respective data drivers 35, image data S1 from a signal source (not shown) is entered into the data signal processing circuit 50, and data is dividedly transmitted to the respective data drivers 35. Thus, the writing time can be made long even when it is configured not to have the signal processing circuit 50 for each picture element 21a as in the above-described embodiment.

For transmission of data signals from the signal source S1 to the data driver 35, a digital data signal or an analog data signal may be used. Where a digital data signal is supplied to the data driver 35, the data driver 35 may have the same configuration as the data signal processing circuit 50 having the D/A conversion means.

For example, in the liquid crystal display device of the invention as described in Embodiments 5 through 10, it is preferable to configure the respective signal processing circuits and pixel selecting switching elements by the thin film transistor having poly-Si as the channel semiconductor film. Accordingly, the switching element, the scanning driver, the data driver, the logic circuit and the like can be formed integrally on the insulating substrate. Besides, an area required for arrangement on the switching array substrate can be decreased, and the signal processing can be made quickly.

It is to be understood that the present invention is not limited to the embodiments described above, however it can be conducted by combining in various ways and modifying in a range not departing from its subject matter.

Although the liquid crystal display device was described in the embodiments described above, the present invention may be applied to any matrix drive type display devices and functional elements. For example, the invention may be applied to a plasma display panel, a field emission display, an X-ray image sensor and others.

As described above, according to the liquid crystal display device of the invention, a large display screen can be formed by connecting a plurality of liquid crystal panels or switching array substrates, and flexibility of combining liquid crystal panels can be prevented from being degraded due to a defective pixel or individual differences in panel properties. Thus, productivity of the liquid crystal display device can be improved. Besides, since joints of a plurality of liquid crystal panels are not visible to an observer, a liquid crystal display device having a large display screen and high display quality can be provided.

Data lines for supplying data signals to a plurality of pixel electrodes which configure one picture element are collectively arranged in a unit of picture element between picture elements, and then transmittance of light of the liquid crystal display device can be improved.

Furthermore, by arranging the data lines in a region between the picture elements, the data lines can be given a large width. Thus, the data lines are made to have a lower resistance, so that the display quality can be improved even when the number of pixel electrode per data line is large.

Moreover, the liquid crystal display device of the invention has the signal processing circuit or data driver for each picture element or pixel block. Therefore, the writing time of data signals into the pixel electrodes can be determined long substantially. A liquid crystal display device having a large capacity such as a large display screen can also drive with an allowance in performance, and the display quality can be improved considerably. Besides, data signals can be transmitted in a digital state into the display region with effects of crosstalk or noises decreased, so that high resolution images can be displayed without depending on a size of the display screen. Power consumption can also be reduced.

Additionally, according to the liquid crystal display device of the invention, when the display screen is large with data lines long, data line capacity large and signal waveforms corrupted, driving in every picture element can be made, and the display quality can be improved substantially.

Moreover, the liquid crystal display device of the invention can transmit the data signals to only the picture elements, which need rewriting. The pixels which are not rewritten but need the polarity invert can be given a voltage buffer with positive polarity and a voltage buffer with negative polarity, and the polarity invert of the drive voltage applied to the liquid crystal layer can be effected without transmitting the data signals. Thus, image persistence can be prevented, and power consumption can be reduced.

What is claimed is:

1. A liquid crystal display device, comprising:
    a first substrate formed of a plurality of insulating substrates, the insulating substrates being tiled to form the first substrate, a matrix array of picture elements formed on the first substrate, pixel electrodes arranged in respective picture elements, the first substrate having signal lines supplying data signals, switching elements intervened between the pixel electrodes and the signal lines, and the switching elements applies the data signals to the pixel electrodes, and a width of respective picture elements perpendicular to a boundary of tiled insulating substrates is almost equal to a width perpendicular to the boundary of the region intervened between adjacent picture elements;
    a second substrate having at least a counter electrode, the counter electrode opposed to a region where the matrix array of the picture elements is formed;
    at least a liquid crystal layer interposed between the first substrate and the second substrate; and,
    a light shielding layer formed on one of the first substrate and the second substrate, and the light shielding layer shields a region intervened between the picture elements.

2. A liquid crystal display device as set forth in claim 1, wherein the signal lines are selectively formed in a region intervened between the picture elements.

3. A liquid crystal display device as set forth in claim 2, wherein respective picture elements having three pixel electrodes, three signal lines are formed in the region intervened between adjacent picture elements, one of the three pixel electrodes in respective picture elements connected with one of the signal lines at a first side of respective picture elements, other two of three pixel electrodes of respective picture elements connected with other two of three signal lines at a second side of respective picture elements, and the second side opposed to the first side.

4. A liquid crystal display device as set forth in claim 1, wherein the signal lines extend over tiled insulating substrates.

5. A liquid crystal display device as set forth in claim 4, further comprises a conductive pattern connected with the signal line and the switching element, wherein a width of the signal line is more than ten times larger than a width of the conductive pattern.

6. A liquid crystal display device, comprising:
    a first substrate formed of a plurality of insulating substrates, the insulating substrates being tiled to form the first substrate, a matrix array of picture elements formed on the first substrate, at least one pixel electrode arranged in respective picture elements, the matrix array of the picture elements comprising first picture elements and second picture elements, inside respective insulating substrates the first picture elements and the second picture elements disposed alternately in a direction perpendicular to a boundary of the tiled insulating substrates, and the first picture elements adjacent intervening the boundary;
    a second substrate having at least a counter electrode, the counter electrode opposed to a region where the matrix array of the picture elements is formed;
    at least a liquid crystal layer interposed between the first substrate and the second substrate; and
    a light shielding layer formed on one of the first substrate and the second substrate, the light shielding layer shielding a region intervened between the first picture elements.

7. A liquid crystal display device as set forth in claim 6, wherein a distance between the first picture elements adjacent intervening the boundary is almost equal to a distance between the first picture elements adjacent in the direction perpendicular to the boundary inside respective insulating substrates.

8. A liquid crystal display device as set forth in claim 6, wherein respective insulating substrates having first signal lines supplying data signals to the pixel electrodes of the first picture element and second signal lines supplying the data signals to the pixel electrodes of the second picture element, the first signal lines having first connecting portions on a first side of the insulating substrate, the second signal lines having second connecting portions on a second side of the insulating substrate opposed to the first side.

9. A liquid crystal display device as set forth in claim 8, further comprising data driver ICs for providing data signal, and the data driver ICs are connected to the first connecting portion of the first signal lines.

10. A liquid crystal display device as set forth in claim 6, wherein the number of defected pixel electrodes included in the first picture elements is equal or less than the number of defected pixel electrodes included in the second picture elements.

11. A liquid crystal display device as set forth in claim 6, wherein the counter electrode is divided corresponding to the tiled insulating substrates.

12. A liquid crystal display device, comprising:
 a first substrate formed of a plurality of insulating substrates, the insulating substrates being tiled to form the first substrates, and having a matrix array of picture elements, signal lines supplying digital data signals, and scanning lines;
 at least a pixel electrode and a thin film transistor arranged in respective picture elements;
 at least a logic circuit supplying analog data signal voltages corresponding to the digital data signals to the picture elements, the logic circuit formed on a region intervened between the picture elements and corresponding to each of the picture elements, and a width of respective picture elements perpendicular to a boundary of tiled insulating substrates is almost equal to a width perpendicular to the boundary of the region intervened between adjacent picture elements;
 a second substrate having at least a counter electrode, the counter electrode opposed to a region where the matrix array is formed;
 at least a liquid crystal layer interposed between the first substrate and the second substrate; and
 a light shielding layer formed on one of the first substrate and the second substrate, the light shielding layer shielding a region intervened between the picture elements,
 wherein a gate electrode of the thin film transistor is connected to each of the scanning lines, and the remaining two electrodes of the thin film transistor are connected to the pixel electrode and the logic circuit, and
 the logic circuit comprises a D/A converter, a memory means for holding the digital data signals, and a gate means for controlling the entry of the digital data signals into the memory means.

13. A liquid crystal display device as set forth in claim 12, wherein respective picture elements have one pixel electrode, and the logic circuit is formed corresponding to the pixel electrode.

14. A liquid crystal display device as set forth in claim 12, wherein the first substrate comprises a plurality of insulating substrates, and the insulating substrates are tiled to form the first substrate.

15. A liquid crystal display device as set forth in claim 14, wherein the signal lines extend over tiled insulating substrates.

16. The liquid crystal display device as set forth in claim 12, wherein the liquid crystal display device has switching means for switching each of the digital data signals.

17. The liquid crystal display device as set forth in claim 12, wherein the logic circuit contains a buffer circuit having a positive voltage and a negative voltage for the analog data signals, and a selecting means for selecting between the positive and negative voltage of the buffer circuit.

18. A liquid crystal display device, comprising:
 a first substrate having a matrix array of picture elements;
 at least a pixel electrode arranged in respective picture elements;
 at least a logic circuit supplying data signals to the picture elements, the logic circuit formed on a region intervened between the picture elements;
 a second substrate having at least a counter electrode, the counter electrode opposed to a region where the matrix array is formed;
 at least a liquid crystal layer interposed between the first substrate and the second substrate; and
 a light shielding layer formed on one of the first substrate and the second substrate, the light shielding layer shielding a region intervened between the picture elements,
 wherein the first substrate comprises a plurality of insulating substrates, and the insulating substrates are tiled to form the first substrate, and
 a width of respective picture elements perpendicular to a boundary of tiled insulating substrates is almost equal to a width perpendicular lo the boundary of the region intervened between adjacent picture elements.

* * * * *